(12) United States Patent
Meirav et al.

(10) Patent No.: US 11,673,090 B2
(45) Date of Patent: Jun. 13, 2023

(54) LOW NOISE, CEILING MOUNTED INDOOR AIR SCRUBBER

(71) Applicant: enVerid Systems, Inc., Westwood, MA (US)

(72) Inventors: Udi Meirav, Newton, MA (US); Israel Biran, Avihayil (IL); Sharon Perl-Olshvang, Pardes Hanna-Karkur (IL); Shawn Brown, Wakefield, MA (US)

(73) Assignee: Enverid Systems, Inc., Westwood, MA (US)

( * ) Notice: Subject to any disclaimer, the term of this patent is extended or adjusted under 35 U.S.C. 154(b) by 0 days.

(21) Appl. No.: 17/466,917

(22) Filed: Sep. 3, 2021

(65) Prior Publication Data

US 2022/0258095 A1 Aug. 18, 2022

Related U.S. Application Data

(63) Continuation of application No. 16/348,082, filed as application No. PCT/US2017/061191 on Nov. 10, 2017, now Pat. No. 11,110,387.

(Continued)

(51) Int. Cl.
*B01D 50/00* (2022.01)
*B01D 45/12* (2006.01)
(Continued)

(52) U.S. Cl.
CPC ......... *B01D 53/0462* (2013.01); *B01D 45/12* (2013.01); *B01D 46/0005* (2013.01);
(Continued)

(58) Field of Classification Search
CPC ................ B01D 53/14; B01D 46/0036; B01D 46/0005; B01D 46/44; B01D 46/0023; B01D 46/46; B01D 45/12; B01D 50/20
See application file for complete search history.

(56) References Cited

U.S. PATENT DOCUMENTS

| 1,522,480 A | 1/1925 | Allen |
| 1,836,301 A | 12/1931 | Jakob et al. |

(Continued)

FOREIGN PATENT DOCUMENTS

| CA | 2640152 A1 | 4/2010 |
| CN | 2141873 Y | 9/1993 |

(Continued)

OTHER PUBLICATIONS

ASHRAE, ANSI/ASHRAE Standard 62.1-2013, "Ventilation for Acceptable Indoor Air Quality," American Society of Heating, Refrigerating and Air-Conditioning Engineers, Inc., Atlanta, GA; 2013, 58 pages.

(Continued)

*Primary Examiner* — Robert A Hopkins
(74) *Attorney, Agent, or Firm* — Cooley LLP

(57) ABSTRACT

In some embodiments, an indoor air cleaning apparatus and a method for removing at least a portion of at least one type of gas from an indoor airflow are disclosed. The apparatus may comprise a cabinet; at least one sorbent bank comprising at least one cartridge; a fan assembly comprising at least one housing including at least one housing inlet and at least one housing outlet, at least one motor and at least one impeller; and a heating element configured to operate in at least one of two modes: an active mode and an inactive mode; and a controller configured to operate in at least two modes: an adsorption mode and a regeneration mode.

14 Claims, 12 Drawing Sheets

Related U.S. Application Data

(60) Provisional application No. 62/420,512, filed on Nov. 10, 2016.

(51) Int. Cl.

| | | |
|---|---|---|
| *B01D 46/00* | (2022.01) | |
| *B01D 53/14* | (2006.01) | |
| *B01D 53/04* | (2006.01) | |
| *B01D 53/30* | (2006.01) | |
| *B01D 46/44* | (2006.01) | |
| *B01D 46/46* | (2006.01) | |
| *B01D 46/62* | (2022.01) | |
| *B01D 50/20* | (2022.01) | |
| *F24F 13/28* | (2006.01) | |
| *F24F 8/15* | (2021.01) | |

(52) U.S. Cl.
CPC ......... *B01D 46/0036* (2013.01); *B01D 46/44* (2013.01); *B01D 46/46* (2013.01); *B01D 46/62* (2022.01); *B01D 50/20* (2022.01); *B01D 53/14* (2013.01); *B01D 53/30* (2013.01); *B01D 2253/102* (2013.01); *B01D 2253/104* (2013.01); *B01D 2253/106* (2013.01); *B01D 2253/108* (2013.01); *B01D 2253/204* (2013.01); *B01D 2253/25* (2013.01); *B01D 2257/106* (2013.01); *B01D 2257/502* (2013.01); *B01D 2257/504* (2013.01); *B01D 2257/70* (2013.01); *B01D 2257/708* (2013.01); *B01D 2258/06* (2013.01); *B01D 2259/4508* (2013.01); *F24F 8/15* (2021.01); *F24F 13/28* (2013.01); *Y02C 20/40* (2020.08)

(56) References Cited

U.S. PATENT DOCUMENTS

| | | |
|---|---|---|
| 2,633,928 A | 4/1953 | Chamberlain |
| 3,042,497 A | 7/1962 | Johnson et al. |
| 3,107,641 A | 10/1963 | Haynes |
| 3,344,050 A | 9/1967 | Mayland et al. |
| 3,511,595 A | 5/1970 | Fuchs et al. |
| 3,594,983 A | 7/1971 | Yearout |
| 3,619,130 A | 11/1971 | Ventriglio et al. |
| 3,702,049 A | 11/1972 | Morris, Jr. |
| 3,751,848 A | 8/1973 | Ahlstrand |
| 3,751,878 A | 8/1973 | Collins |
| 3,795,090 A | 3/1974 | Barnebey |
| 3,808,773 A | 5/1974 | Reyhing et al. |
| 3,885,927 A | 5/1975 | Sherman et al. |
| 3,885,928 A | 5/1975 | Wu |
| 4,182,743 A | 1/1980 | Rainer et al. |
| 4,228,197 A | 10/1980 | Means |
| 4,249,915 A | 2/1981 | Sircar et al. |
| 4,292,059 A | 9/1981 | Kovach |
| 4,322,394 A | 3/1982 | Mezey et al. |
| 4,325,921 A | 4/1982 | Aiken et al. |
| 4,409,006 A | 10/1983 | Mattia |
| 4,433,981 A | 2/1984 | Slaugh et al. |
| 4,451,435 A | 5/1984 | Holter et al. |
| 4,472,178 A | 9/1984 | Kumar et al. |
| 4,530,817 A | 7/1985 | Holter et al. |
| 4,551,304 A | 11/1985 | Holter et al. |
| 4,559,066 A | 12/1985 | Hunter et al. |
| 4,711,645 A | 12/1987 | Kumar |
| 4,810,266 A | 3/1989 | Zinnen et al. |
| 4,816,043 A | 3/1989 | Harrison |
| 4,863,494 A | 9/1989 | Hayes |
| 4,892,719 A | 1/1990 | Gesser |
| 4,917,862 A | 4/1990 | Kraw et al. |
| 4,976,749 A | 12/1990 | Adamski et al. |
| 4,987,952 A | 1/1991 | Beal et al. |
| 5,046,319 A | 9/1991 | Jones |
| 5,087,597 A | 2/1992 | Leal et al. |
| 5,109,916 A | 5/1992 | Thompson |
| 5,137,548 A | 8/1992 | Grenier et al. |
| 5,149,343 A | 9/1992 | Sowinski |
| 5,186,903 A | 2/1993 | Cornwell |
| 5,194,158 A | 3/1993 | Matson |
| 5,221,520 A | 6/1993 | Cornwell |
| 5,231,063 A | 7/1993 | Fukumoto et al. |
| 5,281,254 A | 1/1994 | Birbara et al. |
| 5,290,345 A | 3/1994 | Osendorf et al. |
| 5,292,280 A | 3/1994 | Janu et al. |
| 5,322,473 A | 6/1994 | Hofstra et al. |
| 5,352,274 A | 10/1994 | Blakley |
| 5,376,614 A | 12/1994 | Birbara et al. |
| 5,389,120 A | 2/1995 | Sewell et al. |
| 5,407,465 A | 4/1995 | Schaub et al. |
| 5,443,625 A | 8/1995 | Schaffhausen |
| 5,464,369 A | 11/1995 | Federspiel |
| 5,471,852 A | 12/1995 | Meckler |
| 5,492,683 A | 2/1996 | Birbara et al. |
| 5,584,916 A | 12/1996 | Yamashita et al. |
| 5,614,000 A | 3/1997 | Kalbassi et al. |
| 5,646,304 A | 7/1997 | Acharya et al. |
| 5,672,196 A | 9/1997 | Acharya et al. |
| 5,675,979 A | 10/1997 | Shah |
| 5,702,505 A | 12/1997 | Izumi et al. |
| 5,707,005 A | 1/1998 | Kettler et al. |
| 5,827,355 A | 10/1998 | Wilson et al. |
| 5,869,323 A | 2/1999 | Horn |
| 5,876,488 A | 3/1999 | Birbara et al. |
| 5,904,896 A | 5/1999 | High |
| 5,948,355 A | 9/1999 | Fujishima et al. |
| 5,964,927 A | 10/1999 | Graham et al. |
| 5,984,198 A | 11/1999 | Bennett et al. |
| 6,024,781 A | 2/2000 | Bulow et al. |
| 6,027,550 A | 2/2000 | Vickery |
| 6,102,793 A | 8/2000 | Hansen |
| 6,113,674 A | 9/2000 | Graham et al. |
| 6,120,581 A | 9/2000 | Markovs et al. |
| 6,123,617 A | 9/2000 | Johnson |
| 6,187,596 B1 | 2/2001 | Dallas et al. |
| 6,254,763 B1 | 7/2001 | Izumi et al. |
| 6,280,691 B1 | 8/2001 | Homeyer et al. |
| 6,364,938 B1 | 4/2002 | Birbara et al. |
| 6,375,722 B1 | 4/2002 | Henderson et al. |
| 6,402,809 B1 | 6/2002 | Monereau et al. |
| 6,425,937 B1 | 7/2002 | Kraus et al. |
| 6,428,608 B1 | 8/2002 | Shah et al. |
| 6,432,367 B1 | 8/2002 | Munk |
| 6,432,376 B1 | 8/2002 | Choudhary et al. |
| 6,533,847 B2 | 3/2003 | Seguin et al. |
| 6,547,854 B1 | 4/2003 | Gray et al. |
| 6,605,132 B2 | 8/2003 | Fielding |
| 6,623,550 B2 | 9/2003 | Shah et al. |
| 6,711,470 B1 | 3/2004 | Hartenstein et al. |
| 6,726,558 B1 | 4/2004 | Meirav |
| 6,773,477 B2 | 8/2004 | Lindsay |
| 6,796,896 B2 | 9/2004 | Laiti |
| 6,797,246 B2 | 9/2004 | Hopkins |
| 6,866,701 B2 | 3/2005 | Meirav |
| 6,908,497 B1 | 6/2005 | Sirwardane |
| 6,916,239 B2 | 7/2005 | Siddaramanna et al. |
| 6,916,360 B2 | 7/2005 | Seguin et al. |
| 6,930,193 B2 | 8/2005 | Yaghi et al. |
| 6,964,692 B2 | 11/2005 | Gittleman et al. |
| 6,974,496 B2 | 12/2005 | Wegeng et al. |
| 7,288,136 B1 | 10/2007 | Gray et al. |
| 7,407,533 B2 | 8/2008 | Steins |
| 7,407,633 B2 | 8/2008 | Potember et al. |
| 7,449,053 B2 | 11/2008 | Hallam |
| 7,472,554 B2 | 1/2009 | Vosburgh |
| 7,645,323 B2 | 1/2010 | Massenbauer-Strafe et al. |
| 7,662,746 B2 | 2/2010 | Yaghi et al. |
| 7,666,077 B1 | 2/2010 | Thelen |
| 7,802,443 B2 | 9/2010 | Wetzel |
| 7,846,237 B2 | 12/2010 | Wright et al. |
| 7,891,573 B2 | 2/2011 | Finkam et al. |
| 8,157,892 B2 | 4/2012 | Meirav |
| 8,210,914 B2 | 7/2012 | McMahan et al. |
| 8,317,890 B2 | 11/2012 | Raether et al. |

(56) References Cited

U.S. PATENT DOCUMENTS

| | | |
|---|---|---|
| 8,398,753 B2 | 3/2013 | Sergi et al. |
| 8,491,710 B2 | 7/2013 | Meirav |
| 8,690,999 B2 | 4/2014 | Meirav et al. |
| 8,734,571 B2 | 5/2014 | Golden et al. |
| 9,316,410 B2 | 4/2016 | Meirav et al. |
| 9,328,936 B2 | 5/2016 | Meirav et al. |
| 9,399,187 B2 | 7/2016 | Meirav et al. |
| 9,566,545 B2 | 2/2017 | Meirav et al. |
| 9,802,148 B2 | 10/2017 | Meirav et al. |
| 9,919,257 B2 | 3/2018 | Meirav et al. |
| 9,939,163 B2 | 4/2018 | Meirav et al. |
| 9,950,290 B2 | 4/2018 | Meirav et al. |
| 9,976,760 B2 | 5/2018 | Meirav et al. |
| 9,987,584 B2 | 6/2018 | Meirav et al. |
| 10,046,266 B2 | 8/2018 | Meirav et al. |
| 10,086,324 B2 | 10/2018 | Meirav |
| 10,281,168 B2 | 5/2019 | Meirav et al. |
| 10,525,401 B2 | 1/2020 | Meirav et al. |
| 10,675,582 B2 | 6/2020 | Meirav et al. |
| 10,730,003 B2 | 8/2020 | Meirav |
| 10,765,990 B2 | 9/2020 | Meirav et al. |
| 10,792,608 B2 | 10/2020 | Meirav et al. |
| 10,850,224 B2 | 12/2020 | Meirav et al. |
| 10,913,026 B2 | 2/2021 | Meirav et al. |
| 11,110,387 B2 | 9/2021 | Meirav et al. |
| 11,207,633 B2 | 12/2021 | Meirav et al. |
| 2001/0021363 A1 | 9/2001 | Poles et al. |
| 2001/0054415 A1 | 12/2001 | Hanai et al. |
| 2002/0056373 A1 | 5/2002 | Fielding |
| 2002/0078828 A1 | 6/2002 | Kishkovich et al. |
| 2002/0083833 A1 | 7/2002 | Nalette et al. |
| 2002/0147109 A1 | 10/2002 | Branover et al. |
| 2002/0183201 A1 | 12/2002 | Barnwell et al. |
| 2002/0193064 A1 | 12/2002 | Michalakos et al. |
| 2003/0037672 A1 | 2/2003 | Sircar |
| 2003/0041733 A1 | 3/2003 | Seguin et al. |
| 2003/0097086 A1 | 5/2003 | Gura |
| 2003/0188745 A1 | 10/2003 | Deas et al. |
| 2004/0005252 A1 | 1/2004 | Siess |
| 2004/0020361 A1 | 2/2004 | Pellegrin |
| 2004/0069144 A1 | 4/2004 | Wegeng et al. |
| 2004/0118287 A1 | 6/2004 | Jaffe et al. |
| 2005/0133196 A1 | 6/2005 | Gagnon et al. |
| 2005/0147530 A1 | 7/2005 | Kang et al. |
| 2005/0191219 A1 | 9/2005 | Uslenghi et al. |
| 2005/0262869 A1 | 12/2005 | Tongu et al. |
| 2005/0284291 A1 | 12/2005 | Alizadeh-Khiavi et al. |
| 2005/0288512 A1 | 12/2005 | Butters et al. |
| 2006/0032241 A1 | 2/2006 | Gontcharov et al. |
| 2006/0054023 A1 | 3/2006 | Raetz et al. |
| 2006/0079172 A1 | 4/2006 | Fleming et al. |
| 2006/0112708 A1 | 6/2006 | Reaves |
| 2006/0148642 A1 | 7/2006 | Ryu et al. |
| 2006/0225569 A1 | 10/2006 | Schmidt et al. |
| 2006/0236867 A1 | 10/2006 | Neary |
| 2006/0249019 A1 | 11/2006 | Roychoudhury et al. |
| 2008/0078289 A1 | 4/2008 | Sergi et al. |
| 2008/0119356 A1 | 5/2008 | Ryu et al. |
| 2008/0127821 A1 | 6/2008 | Noack et al. |
| 2008/0135060 A1 | 6/2008 | Kuo et al. |
| 2008/0173035 A1 | 7/2008 | Thayer et al. |
| 2008/0182506 A1 | 7/2008 | Jackson et al. |
| 2008/0210768 A1 | 9/2008 | You |
| 2008/0216653 A1 | 9/2008 | Paton-Ash et al. |
| 2008/0293976 A1 | 11/2008 | Olah et al. |
| 2009/0000621 A1 | 1/2009 | Haggblom et al. |
| 2009/0044704 A1 | 2/2009 | Shen et al. |
| 2009/0071062 A1 | 3/2009 | Hedman |
| 2009/0120288 A1 | 5/2009 | Lackner et al. |
| 2009/0188985 A1 | 7/2009 | Scharing et al. |
| 2009/0214902 A1 | 8/2009 | Pelman et al. |
| 2009/0220388 A1 | 9/2009 | Monzyk et al. |
| 2009/0260372 A1 | 10/2009 | Skinner et al. |
| 2010/0076605 A1 | 3/2010 | Harrod et al. |
| 2010/0154636 A1 | 6/2010 | Liu et al. |
| 2010/0224565 A1 | 9/2010 | Dunne et al. |
| 2010/0251887 A1 | 10/2010 | Jain |
| 2010/0254868 A1 | 10/2010 | Obee et al. |
| 2010/0262298 A1 | 10/2010 | Johnson et al. |
| 2010/0275775 A1 | 11/2010 | Griffiths et al. |
| 2010/0278711 A1 | 11/2010 | Find |
| 2011/0064607 A1 | 3/2011 | Hedman |
| 2011/0079143 A1 | 4/2011 | Marotta et al. |
| 2011/0085933 A1 | 4/2011 | Mazyck et al. |
| 2011/0146494 A1 | 6/2011 | Desai et al. |
| 2011/0179948 A1 | 7/2011 | Choi et al. |
| 2011/0189075 A1 | 8/2011 | Wright et al. |
| 2011/0192172 A1 | 8/2011 | Delacruz |
| 2011/0206572 A1 | 8/2011 | McKenna et al. |
| 2011/0250121 A1 | 10/2011 | Schmidt |
| 2011/0262327 A1 | 10/2011 | Dillon et al. |
| 2011/0269919 A1 | 11/2011 | Min et al. |
| 2011/0277490 A1 | 11/2011 | Meirav |
| 2011/0296872 A1 | 12/2011 | Eisenberger |
| 2012/0004092 A1 | 1/2012 | Raatschen et al. |
| 2012/0012005 A1 | 1/2012 | Burke |
| 2012/0052786 A1 | 3/2012 | Clawsey |
| 2012/0076711 A1 | 3/2012 | Gebald et al. |
| 2012/0129267 A1 | 5/2012 | Daly |
| 2012/0137876 A1 | 6/2012 | Miller |
| 2012/0148858 A1 | 6/2012 | Wu |
| 2012/0152116 A1 | 6/2012 | Barclay et al. |
| 2012/0160099 A1 | 6/2012 | Shoji et al. |
| 2012/0168113 A1 | 7/2012 | Karamanos |
| 2012/0216676 A1 | 8/2012 | Addiego et al. |
| 2012/0222500 A1 | 9/2012 | Riess et al. |
| 2012/0271460 A1 | 10/2012 | Rognli |
| 2012/0272966 A1 | 11/2012 | Ando et al. |
| 2012/0311926 A1 | 12/2012 | Mittelmark |
| 2012/0321511 A1 | 12/2012 | Lorcheim |
| 2013/0052113 A1 | 2/2013 | Molins et al. |
| 2013/0291732 A1 | 11/2013 | Meirav |
| 2013/0331021 A1 | 12/2013 | Rodell |
| 2014/0013956 A1 | 1/2014 | Ericson et al. |
| 2014/0105809 A1 | 4/2014 | Okumura et al. |
| 2014/0242708 A1 | 8/2014 | Lundgren et al. |
| 2014/0298996 A1 | 10/2014 | Meirav et al. |
| 2015/0078964 A1 | 3/2015 | Meirav et al. |
| 2015/0297771 A1 | 10/2015 | Law et al. |
| 2016/0228811 A1 | 8/2016 | Meirav et al. |
| 2016/0271556 A1 | 9/2016 | Okano |
| 2016/0363333 A1 | 12/2016 | Meirav et al. |
| 2017/0227241 A1 | 8/2017 | Claesson et al. |
| 2018/0147526 A1 | 5/2018 | Meirav et al. |
| 2018/0187907 A1 | 7/2018 | Meirav et al. |
| 2018/0207574 A1 | 7/2018 | Meirav et al. |
| 2018/0236396 A1 | 8/2018 | Meirav et al. |
| 2018/0264396 A1 | 9/2018 | Meirav et al. |
| 2018/0339261 A1 | 11/2018 | Meirav et al. |
| 2018/0339262 A1 | 11/2018 | Perl-Olshvang et al. |
| 2019/0143258 A1 | 5/2019 | Meirav et al. |
| 2019/0186762 A1 | 6/2019 | Meirav et al. |
| 2019/0247782 A1 | 8/2019 | Meirav et al. |
| 2019/0262761 A1 | 8/2019 | Meirav |
| 2019/0299154 A1 | 10/2019 | Meirav et al. |
| 2019/0344211 A1 | 11/2019 | Meirav et al. |
| 2019/0346161 A1 | 11/2019 | Meirav et al. |
| 2020/0139294 A1 | 5/2020 | Meirav et al. |
| 2020/0166235 A1 | 5/2020 | Marra et al. |
| 2021/0140655 A1 | 5/2021 | Meirav et al. |
| 2021/0187431 A1 | 6/2021 | Meirav |
| 2021/0260519 A1 | 8/2021 | Meirav et al. |
| 2021/0283545 A1 | 9/2021 | Meirav et al. |

FOREIGN PATENT DOCUMENTS

| | | |
|---|---|---|
| CN | 2612444 Y | 4/2004 |
| CN | 2729562 Y | 9/2005 |
| CN | 1872388 A | 12/2006 |
| CN | 101001767 A | 7/2007 |
| CN | 101072620 A | 11/2007 |
| CN | 200993448 Y | 12/2007 |
| CN | 101199913 A | 6/2008 |
| CN | 101444693 A | 6/2009 |

(56) References Cited

FOREIGN PATENT DOCUMENTS

| | | |
|---|---|---|
| CN | 101500704 A | 8/2009 |
| CN | 101564634 A | 10/2009 |
| CN | 101596390 A | 12/2009 |
| CN | 201363833 Y | 12/2009 |
| CN | 201618493 U | 11/2010 |
| CN | 102233217 A | 11/2011 |
| CN | 202032686 U | 11/2011 |
| CN | 202270445 U | 6/2012 |
| CN | 103119376 A | 5/2013 |
| DE | 102006048716 B3 | 2/2008 |
| EP | 0475493 A2 | 3/1992 |
| EP | 2465596 A1 | 6/2012 |
| ES | 2387791 A1 | 10/2012 |
| JP | S56158126 A | 12/1981 |
| JP | S59225232 A | 12/1984 |
| JP | S60194243 A | 10/1985 |
| JP | H0292373 A | 4/1990 |
| JP | H03207936 A | 9/1991 |
| JP | H0557127 A * | 3/1993 |
| JP | H05161843 A | 6/1993 |
| JP | H0631132 A | 2/1994 |
| JP | H08114335 A | 5/1996 |
| JP | H0985043 A | 3/1997 |
| JP | 2000202232 A * | 7/2000 |
| JP | 2000291978 A | 10/2000 |
| JP | 2001170435 A | 6/2001 |
| JP | 2001232127 A | 8/2001 |
| JP | 3207936 B2 | 9/2001 |
| JP | 2004150778 A | 5/2004 |
| JP | 2005090941 A | 4/2005 |
| JP | 2006275487 A | 10/2006 |
| JP | 2009150623 A | 7/2009 |
| JP | 2009202137 A | 9/2009 |
| JP | 2010149086 A | 7/2010 |
| JP | 2015148227 A | 8/2015 |
| WO | WO-8805593 A1 | 8/1988 |
| WO | WO-0208160 A1 | 1/2002 |
| WO | WO-0212796 A2 | 2/2002 |
| WO | WO-2006016345 A1 | 2/2006 |
| WO | WO-2007128584 A1 | 11/2007 |
| WO | WO-2008155543 A1 | 12/2008 |
| WO | WO-2009126607 A2 | 10/2009 |
| WO | WO-2010091831 A1 | 8/2010 |
| WO | WO-2010124388 A1 | 11/2010 |
| WO | WO-2011114168 A1 | 9/2011 |
| WO | WO-2011146478 A1 | 11/2011 |
| WO | WO-2012071475 A1 | 5/2012 |
| WO | WO-2012100149 A1 | 7/2012 |
| WO | WO-2012120173 A1 | 9/2012 |
| WO | WO-2012134415 A1 | 10/2012 |
| WO | WO-2012145303 A2 | 10/2012 |
| WO | WO-2012152930 A1 | 11/2012 |
| WO | WO-2012158911 A2 | 11/2012 |
| WO | WO-2013012622 A1 | 1/2013 |
| WO | WO-2013074973 A1 | 5/2013 |
| WO | WO-2013106573 A1 | 7/2013 |
| WO | WO-2014015138 A2 | 1/2014 |
| WO | WO-2014047632 A1 | 3/2014 |
| WO | WO-2014078708 A1 | 5/2014 |
| WO | WO-2014153333 A1 | 9/2014 |
| WO | WO-2014176319 A1 | 10/2014 |
| WO | WO-2015042150 A1 | 3/2015 |
| WO | WO-2015123454 A1 * | 8/2015 ......... B01D 53/0415 |
| WO | WO-2017019628 A1 | 2/2017 |

OTHER PUBLICATIONS

Bennett, D. et al., "Indoor Environmental Quality and Heating, Ventilating, and Air Conditioning Survey of Small and Medium Size Commercial Buildings: Field Study," California Energy Commission, Oct. 2011, CEC-500-2011-043, 233 pages.

Gesser, H.D., "The Reduction of Indoor Formaldehyde Gas and that Emanating from Urea Formaldehyde Foam Insulation (UFFI)," Environmental International, Jan. 1984, 10(4), pp. 305-308.

Goeppert, A. et al., "Carbon Dioxide Capture from the Air Using a Polyamine Based Regenerable Solid Adsorbent," Journal of the American Chemical Society, Dec. 2011, 133(5), pp. 20164-20167.

Gray, M.L. et al., "Performance of immobilized tertiary amine solid sorbents for the capture of carbon dioxide," International Journal of Greenhouse Gas Control, Jan. 2008, 2(1), pp. 3-8.

Hodgson, A.T. and Levin, H., "Volatile Organic Compounds in Indoor Air: A Review of Concentrations Measured in North America Since 1990," Report LBNL-51715, Apr. 21, 2003, Berkeley, California: Environmental Energy Technologies Division, E.O. Lawrence Berkeley National Laboratory; 31 pages.

Hotchi, T. et al., "Indoor Air Quality Impacts of a Peak Load Shedding Strategy for a Large Retail Building," Report LBNL-59293, Jan. 2006, Berkeley, California: Environmental Energy Technologies Division, E.O. Lawrence Berkeley National Laboratory; 17 pages.

International Preliminary Examination Report on Patentability dated May 14, 2019, for International Patent Application No. PCT/US2017/061191, by Enverid Systems, Inc., 5 pages.

International Search Report and Written Opinion, dated Jan. 19, 2018, for International Patent Application No. PCT/US2017/061191, by Enverid Systems, Inc., 7 pages.

Jones, C.W., "CO2 Capture from Dilute Gases as a Component of Modern Global Carbon Management," Annual Review of Chemical and Biomolecular Engineering, Jul. 2011, 2:31-52.

Kang, D-H. et al. (Jun. 14, 2007) "Measurements of VOCs emission rate from building materials during bakeout with passive sampling methods" Clima 2007 WellBeing Indoors, REHVA World Congress, Jun. 10-14, 2007, Helsinki, Finland. O. Seppnen and J. Steri (Eds.) FINVAC [online]. Retrieved from: http://www.inive.org/members_area/medias/pdf/Inive%5Cclima2007%5CA12%5CA12C1334.pdf, 6 pages.

Ma, C. et al., "Removal of low-concentration formaldehyde in air by adsorption on activated carbon modified by hexamethylene diamine," Carbon, 49(8), Jul. 2011, pp. 2873-2875.

Nuckols, M. L. et al., Technical Manual: Design Guidelines for Carbon Dioxide Scrubbers. Naval Coastal Systems Center, NCSC Tech Man 4110, Revision A, Jul. 1985, 10 pages.

Offerman, F.J. et al., "A Pilot Study to Measure Indoor Concentrations and Emission Rates of Polycyclic Aromatic Hydrocarbons," Indoor Air, Dec. 1991, 4:497-512.

Persily, A. and de Jonge, L. (Sep. 2017) "Carbon dioxide generation rates for building occupants" Indoor Air, 27(5):868-879. NIST Author Manuscript [online]. Retrieved from: https://www.ncbi.nlm.nih.gov/pmc/articles/PMC5666301/, on Jan. 8, 2020, 25 pages.

Pickenpaugh, Joseph G., Capt., "Assessment of Potential Carbon Dioxide-Based Demand Control Ventilation System Performance in Single Zone Systems," Thesis, Air Force Institute of Technology, Mar. 2013, https://apps.dtic.mil/dtic/tr/fulltext/u2/a576145.pdf, 105 pages.

Serna-Guerrero, R. et al., "Triamine-grafted pore-expanded mesoporous silica for CO2 capture: Effect of moisture and adsorbent regeneration strategies," Adsorption, Dec. 2010, 16:567-575.

Sidheswaran, M.A. et al., "Energy efficient indoor VOC air cleaning with activated carbon filter (ACF) filters," Building and Environment, Jan. 2012, 47:357-367.

United States Environmental Protection Agency, "Carbon Adsorption for Control of VOC Emissions: Theory and Full Scale System Performance", EPA-450/3-88-012, Jun. 1988, 84 pages.

United States Environmental Protection Agency, "EPA Ventilation and Air Quality in Offices, Fact Sheet" Air and Radiation (6609J), 402-F-94-003, Revised Jul. 1990, 4 pages.

Wu, X. et al., "Volatile Organic Compounds in Small- and Medium-Sized Commercial Buildings in California. Supporting Information," Environmental Science & Technology, 2011, 45(20):S1-S29 [online]. Retrieved from: https://pubs.acs.org/doi/suppl/10.1021/es202132u/suppl_file/es202132u_si_001.pdf.

Zorflex ACC, 100% Activated Woven Carbon Cloth. Calgon Carbon Corporation, 2008, www.calgoncarbon.com, 2 pages.

Zorflex® ACC, 100% Activated Woven Carbon Cloth, Calgon Carbon Corporation, 2011, www.calgoncarbon.com, 2 pages.

* cited by examiner

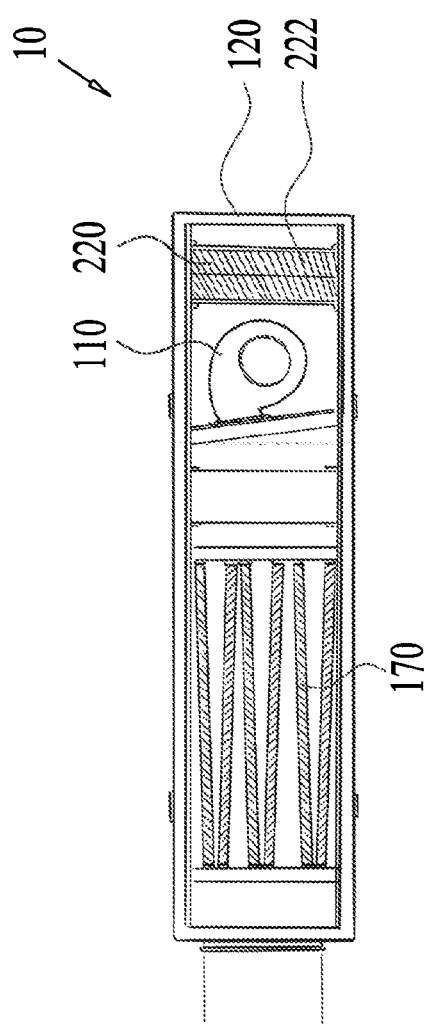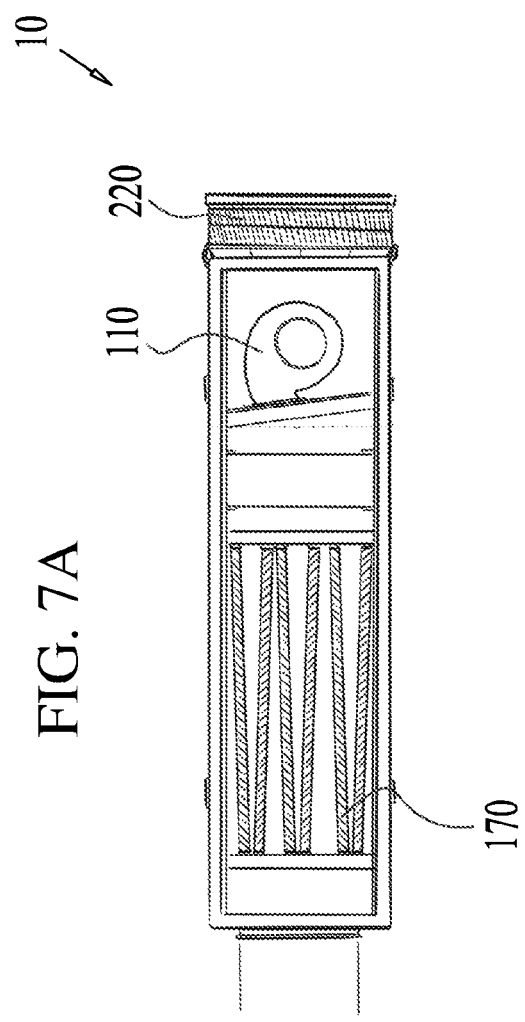

LOW NOISE, CEILING MOUNTED INDOOR AIR SCRUBBER

RELATED APPLICATIONS

This application is a continuation of U.S. application Ser. No. 16/348,082, filed May 7, 2019 entitled "Low Noise, Ceiling Mounted Indoor Air Scrubber", now U.S. Pat. No. 11,110,387, which is a 35 U.S.C. § 371 national stage entry of PCT International Application No.: PCT/US2017/061191, filed Nov. 10, 2017, entitled "Low Noise, Ceiling Mounted Indoor Air Scrubber," which claims benefit of and priority to U.S. provisional patent application No. 62/420,512, filed Nov. 10, 2016, titled "Ceiling Mounted Regenerable Indoor Scrubber". The entire disclosure of each of the above-noted applications is herein expressly incorporated by reference.

FIELD OF THE DISCLOSURE

Embodiments of the present disclosure generally relate to air treatment and more particularly to scrubbing indoor air in buildings and homes.

BACKGROUND

Scrubbing indoor air is a useful technique for improving indoor air quality and eliminating or reducing the need for fresh air ventilation in buildings. Sorbents can be deployed in air treatment devices that receive indoor air, remove contaminants through contact with the sorbent, and return the treated air into the building directly or through an air circulation system. The sorbents can be regenerable, meaning that they further lend themselves to repeated use through temperature-swing adsorption, whereby upon saturation of the sorbent, a combination of heat and a purging air stream regenerates the sorbent's adsorption capacity.

In buildings with central air circulation, the location of these air treatment devices can be anywhere along the circulation path of the indoor air, including placing them in proximity to the central air handling system, on the roof, in a mechanical room or in a return air plenum.

The central location of the scrubber, which is due to the fact that air is circulating, has been essential to its practicality as an air quality solution for buildings. This allows the scrubber to be placed in unobtrusive places like a mechanical room or an air plenum, and with easy access to an exhaust outlet where it can purge contaminants during the regeneration cycle, and, in some cases, an outside air source to be used during regeneration to purge the sorbents.

In the absence of central circulation, scrubbing indoor air poses a unique challenge since a centralized or distant scrubber can no longer effectively address air quality in different locations in the building. Rather, scrubbers must be positioned in proximity of each targeted area or room and be configured with outside access for regeneration exhaust. Furthermore, if scrubbers are located in working or living spaces, it is important to minimize noise, physical imposition and any other disruptions, including filter replacements and other maintenance activities.

SUMMARY OF SOME OF THE EMBODIMENTS

There is thus provided according to some embodiments, a low profile, low noise, compact indoor air scrubber configured for cleaning indoor air, using in-situ regenerated sorbents to capture contaminant gases in the indoor air. The scrubber may have one inlet and two outlets, one outlet for clean air and the other for regeneration exhaust. Typically, the scrubber is attached to the ceiling or, where a drop ceiling is in place, it is positioned above the drop ceiling and is in fluid communication with the room via one, two or more short ducts or conduits that lead to openings or grilles in the drop ceiling. A separate flexible conduit leads from the exhaust outlet to an air passage outside the building, usually via a bathroom or kitchen exhaust, a smokestack, or a window in the building. The scrubber may comprise fans, dampers and/or heating means and well as electronic circuits. The electronic circuits may operate the fans, dampers and a built-in heater to control the scrubber's operating mode as it swings periodically from scrubbing (i.e. adsorption) to regeneration and back.

In some embodiments, there is provided a low-noise, low-profile air cleaning device, namely an indoor air scrubbing or gas adsorption apparatus, comprising one or more inlets, a first outlet, a second outlet, dampers to control the outlets, one or more fans, a heater coil, a sorbent bank, and an electronic control circuit, that can operate in at least two modes: adsorption and regeneration, where in adsorption mode, air enters through one or more of the inlets and exits through a first outlet after passing through the sorbent bank, such that at least one type of gas species is partially captured by the sorbent upon passing through the bank. In the regeneration mode, air enters through one or more of the inlets and exits through a second outlet, after passing through the heating coil and the sorbent bank, where the coil is heated, causing release of at least one type of gas species. The outlet dampers, fan and heater are controlled by the electronic control circuit to determine or schedule in which mode the device operates.

In some embodiments, the low vertical profile and the low noise are facilitated by the design of the fan, which is configured to provide uniform air distribution over a low and wide cross section of the system, and deliver sufficient thrust to overcome the resistance of the sorbents, filters and conduits. The use of a plurality of cylindrical impellers on a shared lateral axis is particularly suitable for this purpose.

In some embodiments, an indoor air cleaning apparatus for removing at least a portion of at least one type of gas from an indoor area of a building is disclosed. In some embodiments, the apparatus may comprise a cabinet including a substantially square or rectangular cross section having a height H a width W, and a length L, the cabinet also including at least one inlet, a first outlet, and a second outlet, wherein the cabinet is configured for deployment from an elevated position within an indoor area of a building. Further, the apparatus may include a plurality of dampers for managing airflow through at least one or more of the apparatus, the first outlet and the second outlet; and at least one sorbent bank comprising a plurality of cartridges, wherein each cartridge: comprises a rigid frame, at least a first and a second permeable surface, and one or more sorbent materials contained within the frame, and is configured to receive an airflow through the first permeable surface, over and/or through the sorbent, and expel the airflow through the second surface.

In addition, in some embodiments, the apparatus may have a fan assembly comprising a panel including at least one panel opening, at least one housing including at least one housing inlet and at least one housing outlet, at least one motor and a plurality of parallel, forward curved cylindrical impellers. In some embodiments, the panel may be configured to substantially cover a cross section of the cabinet perpendicular to an airflow direction of the fan assembly; the plurality of parallel, forward curved cylindrical impellers may be arranged on a common impeller axis oriented in a direction parallel to the panel; the fan motor may be located between two impellers; the at least one housing may be attached to the panel such that the at least one housing outlet substantially corresponds to the at least one panel opening so as to allow an airflow exiting the impellers to flow therethrough; and the panel opening may be configured to direct airflow from the housing toward at least the sorbent bank.

In some embodiments, the apparatus may also include a heating element configured to be in one of at least two modes: an active mode whereby an airflow passing over the heating element is heated, and an inactive mode whereby an airflow passing over the heating element is not heated. The apparatus may also comprise a controller configured to operate in at least two modes: an adsorption mode and a regeneration mode, and configured to control at least the plurality of dampers, fan assembly and heating element. In some embodiments, in the adsorption mode, the impeller may draw an indoor airflow from the indoor area, the indoor air entering the inlet of the cabinet then the inlet of the housing, whereby the indoor airflow is optionally directed over the heating element in inactive mode and into the sorbent bank such that at least a portion of at least one type of gas contained in the airflow is captured by the sorbent, the indoor airflow then exiting the cabinet via the first outlet of the cabinet. In some embodiments, in the regeneration mode, the impeller may draw an indoor airflow from the indoor area, the indoor air entering the inlet of the cabinet then the inlet of the housing, whereby the indoor airflow is directed over the heating element in active mode and thereafter the heated indoor airflow is directed to flow over the sorbent such that at least a portion of the at least one type of gas captured by the sorbent during the adsorption mode is released therefrom, then out the second outlet of the cabinet. In some embodiments, the controller can control the plurality of dampers, fan assembly and heating element based upon at least one of a schedule and a concentration level of the at least one type of gas in the indoor airflow.

In some embodiments, the deployment of the cabinet may comprise hanging the apparatus from at least one of a ceiling and a wall of the indoor area. In some embodiments, the apparatus may further comprise a filter configured for removing particulate matter from the air stream, wherein the filter is arranged to filter an airflow prior to or after being received by the sorbent bank. In some embodiments, the filter may comprise a plurality of cyclonic separators.

In some embodiments, the panel is arranged at an oblique angle relative to the height direction of the cabinet between about 5 and about 30 degrees. In yet some embodiments, the panel may be arranged at an oblique angle relative to the height direction between about 2 and about 45 degrees; about 3 and about 40 degrees; about 7 and about 25 degrees; about 10 and about 20 degrees, including values and subranges therebetween.

In some embodiments, the at least one gas type is selected from the group consisting of: carbon dioxide, formaldehyde, acetaldehyde, volatile organic compounds, sulfur oxide, nitrous oxide, hydrogen sulfide, carbon monoxide, and ozone.

In some embodiments, the apparatus may include a conduit in fluid communication with the second outlet, wherein the conduit is configured to carry the airflow expelled by the second outlet away from the room or outside the building. Further, in some embodiments, the apparatus may include at least one of: one or more appendages, brackets, hooks, ears, holes, bars, tabs, and sockets.

In some embodiments, the sorbent bank may be configured for access such that each of or the plurality of cartridges can removed or replaced, wherein access is via at least one of an opening and/or a removable or movable access panel. In some embodiments, at least two of the cartridges are arranged substantially parallel to each other and to the overall airflow direction.

In some embodiments, an indoor air cleaning method for adsorbing at least one type of gas from an indoor airflow without the use of an independent ventilation or circulation system is disclosed. The method may comprise the step of deploying one or more of the apparatuses disclosed above from an elevated position within the room and operating the device to remove at least a portion of the at least one type of gas from the indoor air of the room, wherein deploying comprises hanging the one or more apparatus from at least one of the ceiling or a wall of the room. In some embodiments, the step of deploying the one or more apparatuses may comprise placing the one or more apparatuses within a drop ceiling such that, the one or more apparatuses are configured to receive indoor air from the room via a first grill or first opening in the drop ceiling, and returns air to the room via a second grill or second opening in the drop ceiling.

In some embodiments, an indoor air cleaning apparatus for removing at least a portion of at least one type of gas from an indoor airflow is disclosed. In some embodiments, the apparatus may comprise a cabinet including a substantially square or rectangular cross section, a first outlet, and a second outlet, wherein the cabinet is configured for hanging from an elevated position within an indoor area of a building; at least one sorbent bank comprising at least one cartridge, wherein the at least one cartridge includes one or more sorbent materials; a fan assembly comprising at least one housing including at least one housing inlet and at least one housing outlet, at least one motor and at least one impeller, wherein the at least one housing is arranged within the cabinet such that the at least one housing outlet directs an airflow to the sorbent bank; a heating element configured to operate in at least one of two modes: an active mode whereby an airflow passing over the heating element is heated, and an inactive mode whereby an airflow passing over the heating element is not heated or the airflow is re-directed so as to not flow over the heating element; and a controller configured to operate in at least two modes: an adsorption mode and a regeneration mode, and configured to control at least the fan assembly and the heating element.

In some embodiments, in the adsorption mode, the impeller draws an indoor airflow from the indoor area, the indoor air entering the inlet of the housing, the housing directing the indoor airflow optionally over the heating element in inactive mode, the airflow then being received into at least the sorbent bank such that at least a portion of one type of gas is captured by the sorbent, the indoor airflow then exiting the cabinet via the first outlet of the cabinet. In some embodiments, in the regeneration mode, the impeller draws an indoor airflow from the indoor area by entering the inlet of the housing, the housing directing the indoor airflow over the heating element in active mode and thereafter the heated indoor airflow is directed to flow over the sorbent such that the at least a portion of the one type of gas captured by the sorbent is released therefrom, then out the second outlet of the cabinet. In some embodiments, the controller may control at least the fan assembly and heating element based upon at least one of a schedule and a concentration level of the at least one type of gas in the indoor airflow.

In some embodiments, the device may be further configured with a particle filter before or after the sorbent bank. The particle filter may comprise any suitable filter or alternatively, an array of cyclonic separators, offering less frequent need for replacement or maintenance.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3A shows the conduit leading to a bathroom exhaust, FIG. 3B shows the conduit leading to a window, according to an embodiment of the present disclosure.

Figure 5B:
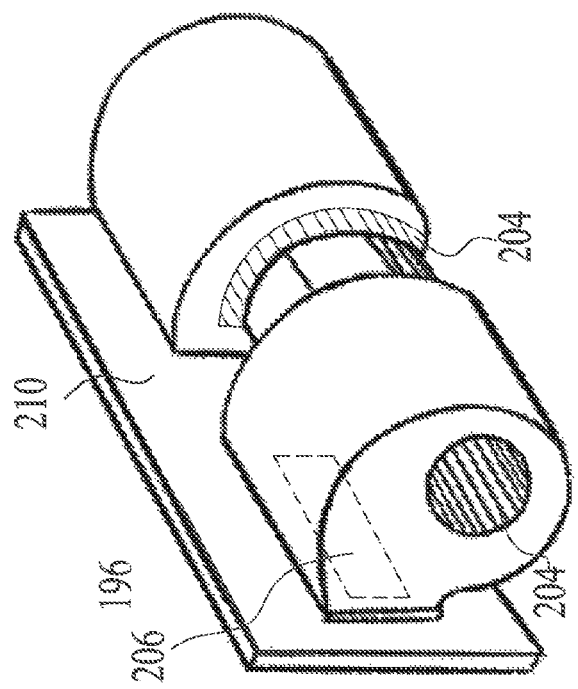
Figure 5A:
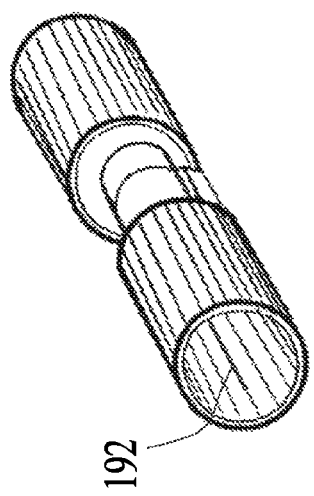
Figure 5C:
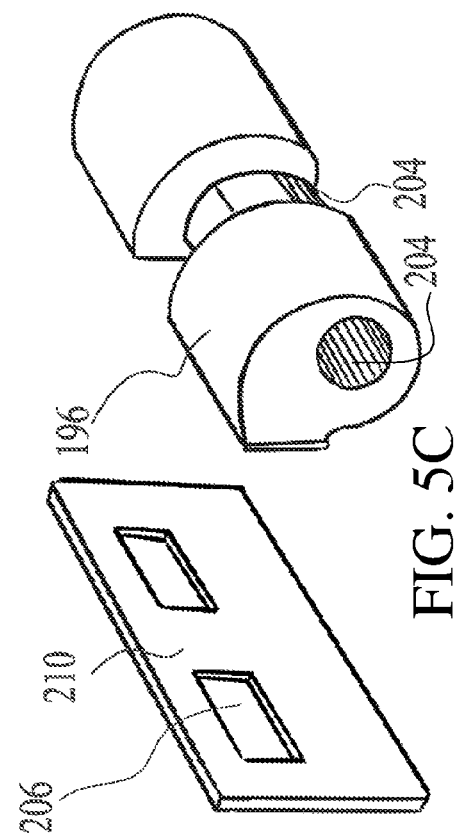
Figure 5E:
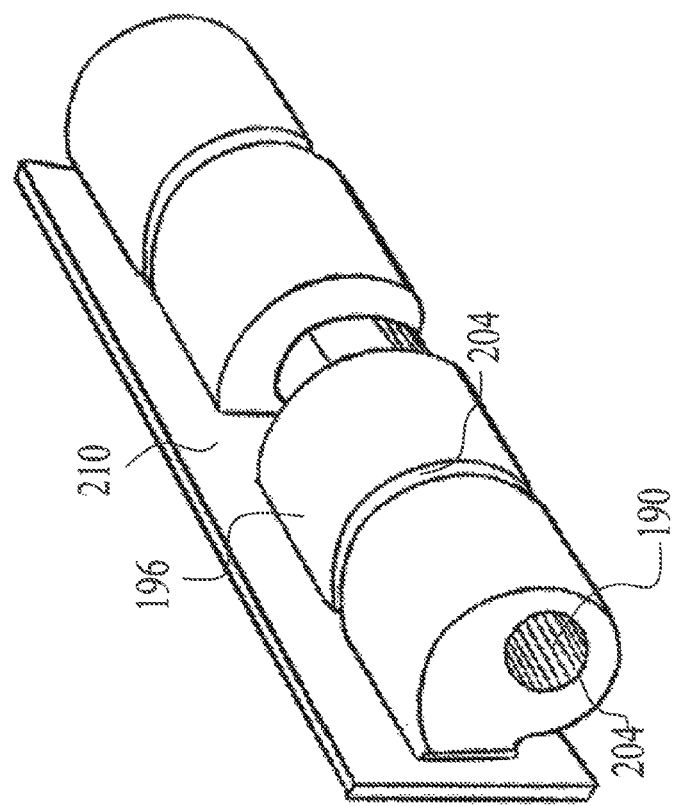
Figure 5D:
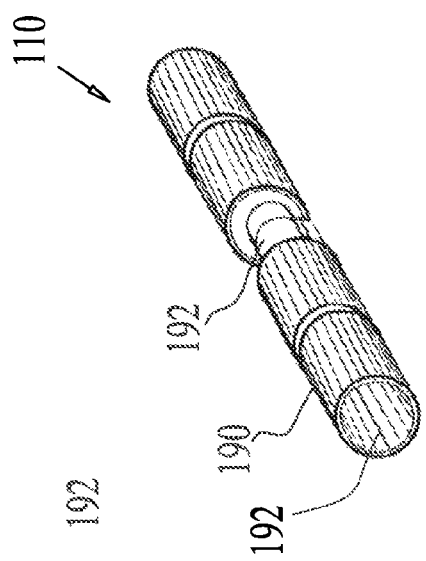
Figure 5F:
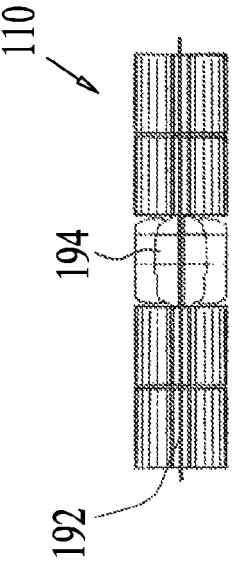

FIGS. 5A, 5B, 5C, 5D, 5E and 5F each show elements of an embodiment of a fan assembly, FIG. 5A shows two impellers on a shared horizontal axis forming the core of the fan and a corresponding fan assembly with housing attached to a panel is an assembled state (FIG. 5B) and in a disassembled state (FIG. 5C); FIGS. 5D and 5E show a fan assembly with four impellers, two at each side of the horizontal axis (FIG. 5D), and its fan assembly housing attached to a panel (FIG. 5E), and FIG. 5F shows a front view of the four impeller design with the motor in the middle, according to an embodiment of the present disclosure.

Figure 6:
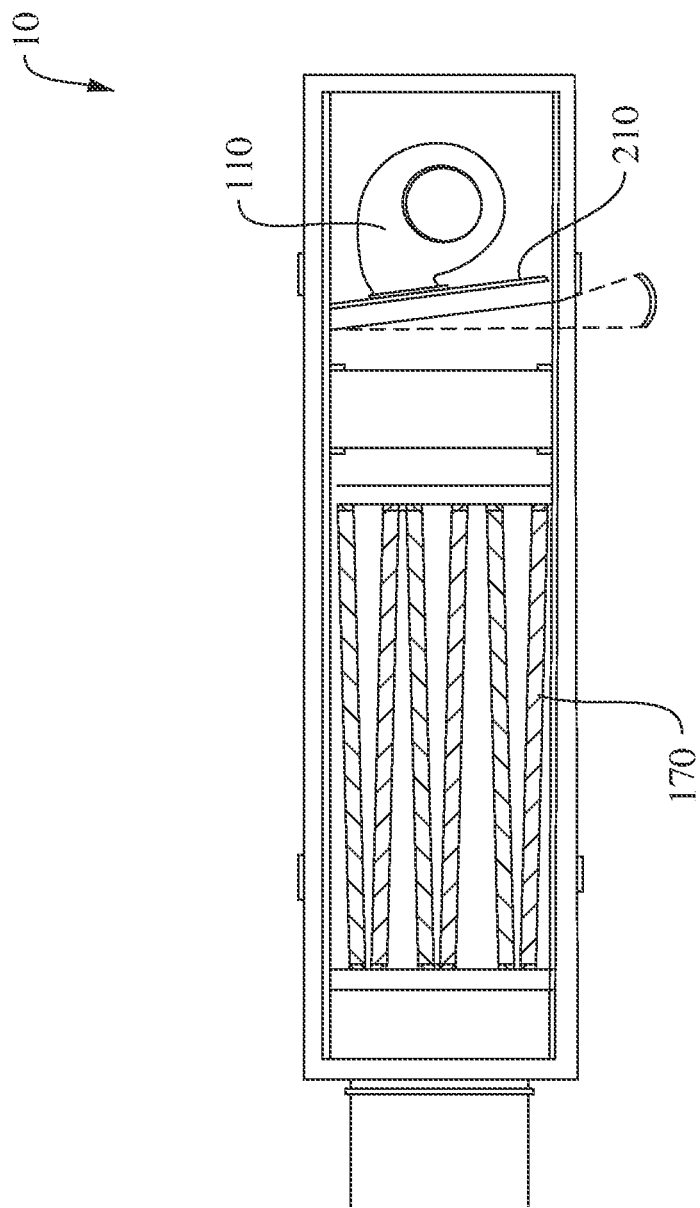

FIG. 6 shows a side view of the fan assembly inside the cabinet with the supporting panel tilted relative to the vertical to improve air distribution among the sorbent sheets, according to an embodiment of the present disclosure.

FIGS. 7A and 7B each show a low profile scrubber with a pre-filter assembly, where the pre-filter comprises media or arrays of miniature cyclonic separators, FIG. 7A shows the pre-filter assembly inside the cabinet and FIG. 7B shows the pre-filter assembly as an external module attached to the inlet, according to an embodiment of the present disclosure.

Figure 8:
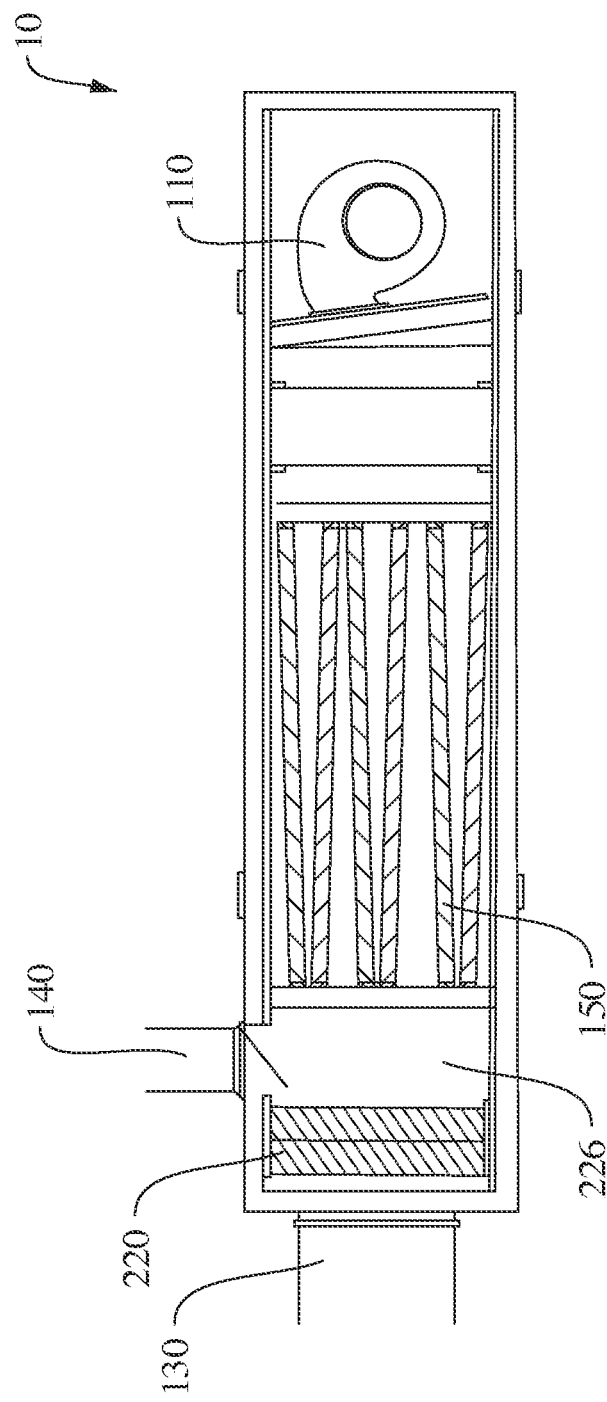

FIG. 8 shows a scrubber where the exhaust outlet is located on the cabinet between the sorbent bank and a subsequent air cleaning component, according to an embodiment of the present disclosure.

Figure 9:
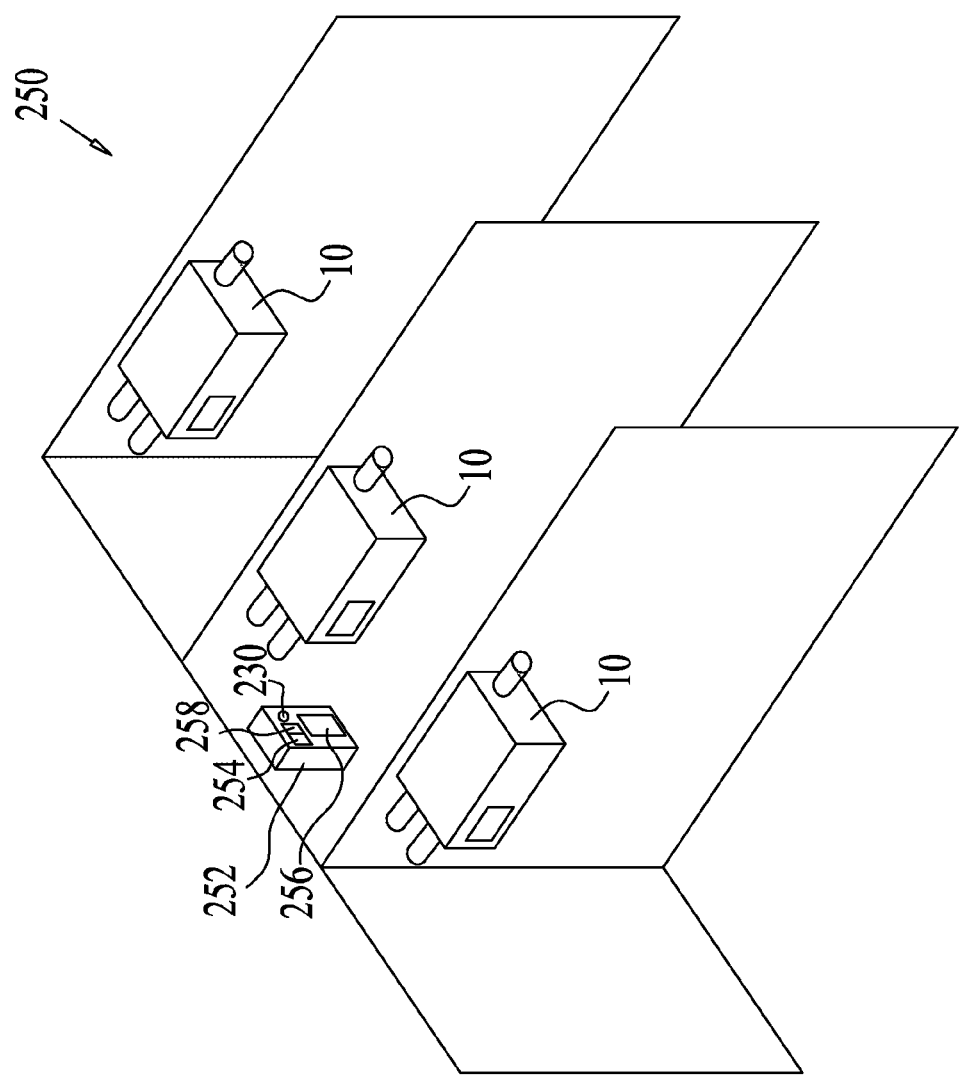

FIG. 9 shows an indoor air cleaning system comprising a plurality of scrubbers, according to an embodiment of the present disclosure.

DETAILED DESCRIPTION OF SOME OF THE EMBODIMENTS

In order to scrub indoor air in a room without relying on central ventilation or circulation, a scrubber is designed for placement in or above the room. In some embodiments, the scrubber is placed over the ceiling or just below the ceiling, thereby minimizing its physical or visual imposition. The scrubber can be supported in its place by attaching it to the ceiling or to the walls. In some embodiments, the scrubber may be further designed for a horizontal configuration with minimum vertical profile.

Figure 1B:
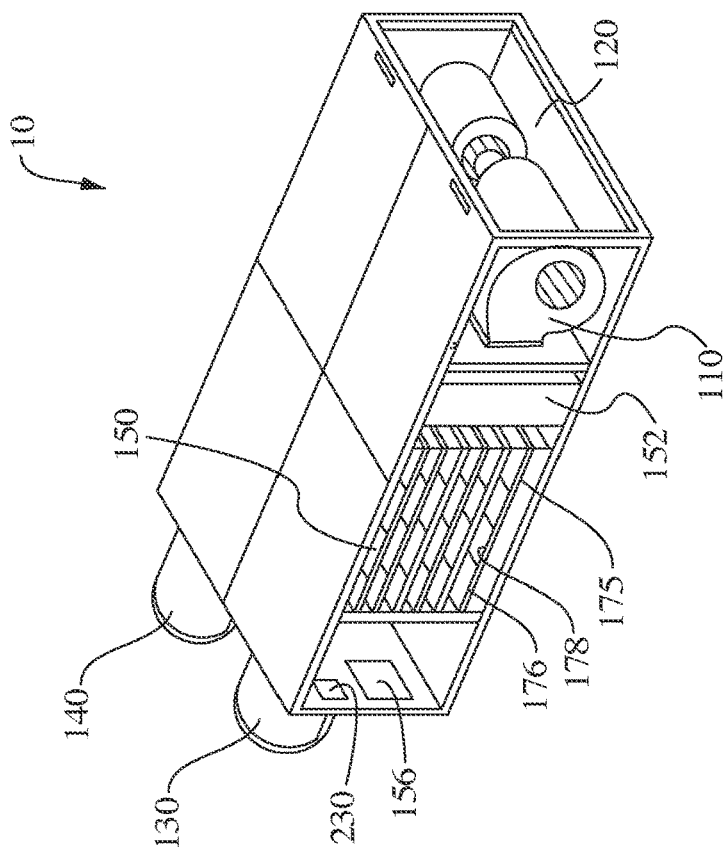
FIGS. 1A and 1B are each a schematic illustration of a low profile scrubber configured for ceiling mounting and for in-situ regeneration, shown sealed (FIG. 1A) and unsealed (FIG. 1B), according to an embodiment of the present disclosure.
Figure 1A:
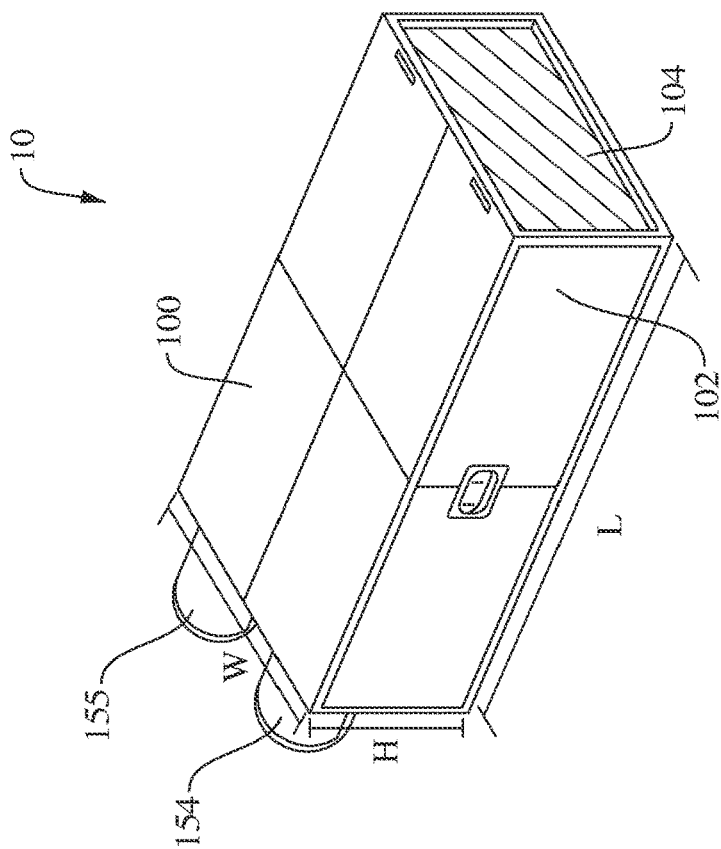

FIGS. 1A and 1B, are each a schematic illustration of the scrubber 10, according to an embodiment of the present disclosure. The scrubber 10 comprises a sealed box or cabinet 100 (FIG. 1A), typically a rectangular one with a length (L), width (W) and a height (H). These directions are referred to as longitudinal, lateral and vertical, respectively. The air flows along the length of the cabinet, namely longitudinally, which ordinarily would be parallel to the ceiling and floor. FIG. 1B shows the same scrubber 10 with the longitudinal side panel 102 and the inlet side panel or grille 104 removed. As shown in FIG. 1B, the scrubber 10 further comprises a fan 110, an inlet 120, and a first outlet 130 to direct clean air back to the room, and a second outlet 140 for regeneration exhaust. In certain embodiments the inlet 120 is simply a rectangular or circular opening on the incoming side of the cabinet, which may be protected with a grille 104 or a screen. Other shapes of the inlet 120 may be used for aesthetic or functional purposes. In other embodiments, the opening can have a flange or a short rectangular or circular sleeve which can facilitate attachment of an air duct.

The scrubber 10 further comprises a sorbent bank 150 comprising sorbent sheets or cartridges 170, and a heater 152 which may comprise a heating element such as a heating coil or any other suitable heating means. The first and second outlets 130 and 140 may be separately governed by corresponding first damper 154 and second damper 155 or shutters that are equipped with a controller 156 including actuators and activated by a control circuit. The inlet 120 generally does not require a damper but may have one. The outlets 130 and 140 may further comprise a circular or rectangular flange, or a sleeve, to facilitate connection to an air duct.

The room or space may be located in an enclosed environment which may include a building, an office building, a commercial building, a bank, a residential building, a house, a school, a factory, a hospital, a store, a mall, an indoor entertainment venue, a storage facility, a laboratory, a vehicle, an aircraft, a ship, a bus, a theatre, a partially and/or fully enclosed arena, an education facility, a library and/or other partially and/or fully enclosed structure and/or facility which can be at times occupied by equipment, materials, live occupants (e.g., humans, animals, synthetic organisms, etc.) and/or any combination thereof.

In some embodiments, some or all of the cabinet walls 158 may be further configured with thermal and/or acoustic insulation, to minimize heat from the heater 152, and noise from the fan 110, escaping to the room. The cabinet walls 158 may be formed of a thermal and/or acoustic insulation material. Additionally or alternatively a thermal and/or acoustic insulation layer may line the cabinet walls 158.

Figure 2A:
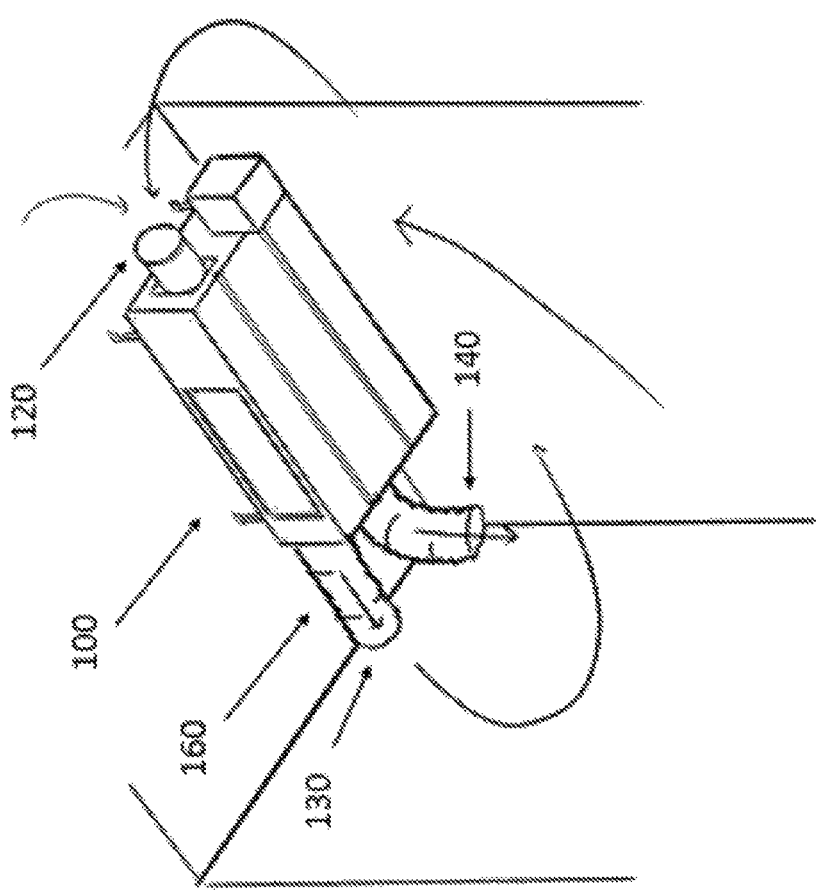
FIGS. 2A and 2B are each a schematic illustration of the deployment of the ceiling-attached scrubber, in the case of an open ceiling (FIG. 2A), and with a drop ceiling, where the scrubber is hidden above the drop ceiling (FIG. 2B), according to an embodiment of the present disclosure.
Figure 2B:
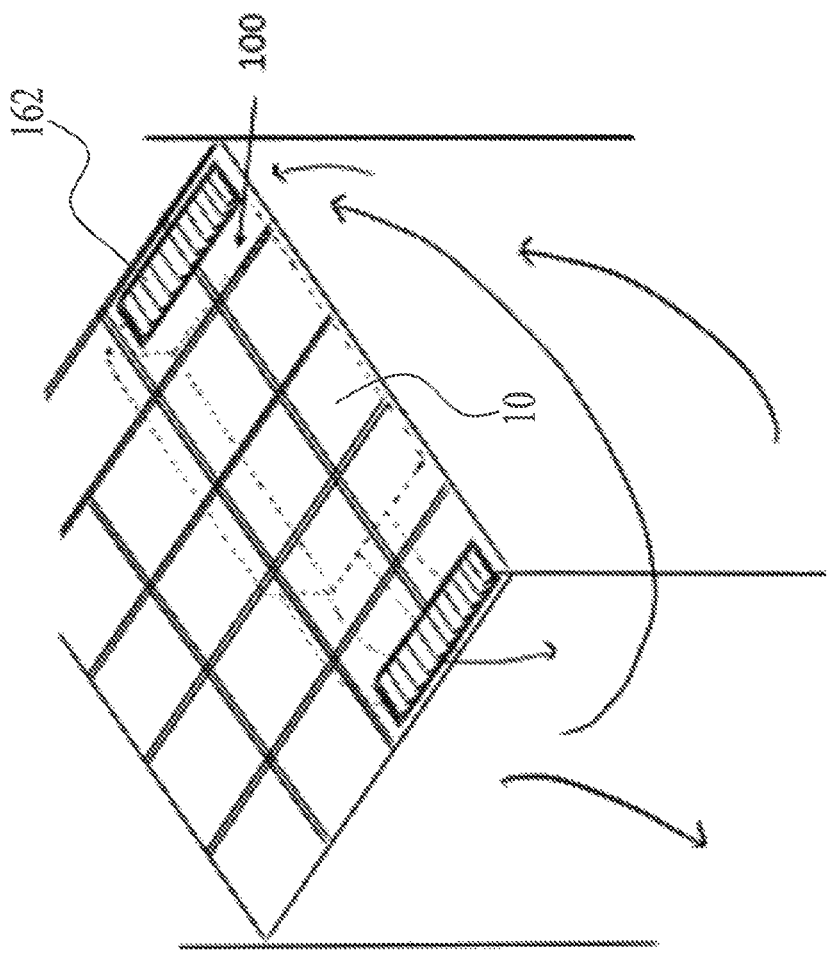

FIGS. 2A and 2B are each a schematic illustration of the deployment of the ceiling-mounted scrubber 10, according to an embodiment of the present disclosure. In FIG. 2A the scrubber 10 is configured for deployment from an elevated position within an indoor area of a building and may be attached to the ceiling directly, secured by bolts, screws or any other suitable attachment. Alternatively, it can be hanging from the ceiling or wall with the help of supporting brackets, rods, cables, straps, appendages, hooks, ears, bolts, holes, bars, tabs, sockets or other suitable structures. The inlet 120 and the first outlet 130 are open to the room either directly or via an open ended duct 160 that extends towards the room. The end of these ducts may comprise a diffuser or a grille 162. In some embodiments, common in commercial buildings, there is a drop ceiling, also known as a tiled ceiling, false ceiling or acoustic ceiling. The scrubber 10 can be supported above the drop ceiling and connected to the grille 162 or an opening in the drop ceiling via a short duct segment, as shown in FIG. 2B. A separate grille may be configured for the inlet 120 and the first outlet 130 or second outlet 140.

In some embodiments, it is advantageous to have a low vertical profile, namely minimize the height (H), of the scrubber 10. For example, if the scrubber is hanging below the ceiling, it must not take up too much head room. Alternatively, if it is positioned above the drop ceiling, the amount of vertical space available above the drop ceiling may be very limited. Therefore, designing the scrubber 10 with a low vertical profile can be an important feature or consideration. In some embodiments, the scrubber height may be less than about 20 cm. In some embodiments the scrubber height may be less than about 30 cm. In some embodiments the scrubber height may be less than 50 cm. These unique requirements have implications for the design and selection of the key components of the scrubber 10, including the sorbent bank 150 and the fan 110.

When the fan 110 is turned on, air is drawn from the indoor space or room via the inlet 120 and forced to flow through the sorbent bank 150 and through the first outlet 130, back to the space or the room. As the air flows through the bank 150, it briefly passes through or along the sorbents in the bank 150, where contaminant molecules are adsorbed and captured before the air proceeds to flow towards the first outlet 130. As a result, air with reduced level of these contaminants is returned to the room. Due in part to the motion of air in the room caused by this action, also shown schematically in FIGS. 2A and 2B, the air in the room is mixed and continually cleaned by the scrubber 10. Thus the performance of the scrubber is not dependent on other means of circulation or mixing of the air.

The types of gas species comprising contaminants removed by this action depend in part on the choice of the sorbent material. Various sorbents capture many types of indoor molecular contaminants, including but not limited to acidic gases, carbon dioxide, volatile organic compounds, organic gases like formaldehyde, acetaldehyde and methane, as well as inorganic gases such as ozone, nitrous oxides, sulfur oxides, carbon monoxide, hydrogen sulfide, radon and many others.

Sorbents may include molecular sieves, zeolite, natural and synthetic activated carbon, silica, synthetic silica, alumina, polymers, fibers, amines, metal-organic frameworks, clays and various sorbents formed by impregnating or coating high surface area materials, for example. In an embodiment a liquid amine or amine polymer is supported on a high surface area inorganic material like silica, alumina, clay or zeolite. The sorbent may comprise solid supported amines or any other adsorbent material, in any suitable form, such as porous granular solids or pelleted shaped solids, for example. In some embodiments, combinations, mixtures, or blends of different materials can provide superior air cleaning adsorption performance.

The sorbents may lose their adsorptive efficiency as they become saturated with adsorbate molecules of the gas species. This is where regeneration of the sorbent becomes significant. Temperature swing adsorption (TSA) is a technique where a sorbent is repeatedly cycled between adsorption and regeneration. During adsorption the sorbent is kept at neutral temperature (i.e. room temperature) or even cooled, whereas during regeneration it is heated. During adsorption various molecular species are captured by the sorbent, settling on its surface through physisorption or chemisorption, thereby removing the molecular gas species from the air stream. On the other hand, during regeneration, the elevated temperature of the sorbent causes at least a portion of the captured molecular gas species to be released into the airstream, which in turn can be exhausted to the appropriate second outlet 140. After regeneration the sorbent is cooled and then able to resume its scrubbing action. This TSA cycle can be repeated many times, allowing long term use of the sorbent.

A feature of the scrubber 10 is its ability to perform automated, in-situ regeneration. This is enabled by a combination of a heater 152, a separate exhaust outlet 140, and a control circuit of the controller 156 that manages the heater 152 and the air flow path by means of fans 110, dampers 154 and 155, and their respective actuators. During regeneration, the coil of the heater 152 may be heated with electric power, and as air passes over the heater 152 and towards the sorbent bank 150, the sorbent itself is heated. The heated sorbent gradually releases the captured contaminants. After a sufficient amount of the contaminants are thus released, the sorbent is allowed to cool down and then resume its air cleaning operation.

The heater 152 is configured to be in an active mode whereby the airflow passing over the heater 152 is heated, and in an inactive mode whereby the airflow passing over the heater 152 is not heated.

Some sorbents are better suited for regeneration than others, especially with regard to an ability to regenerate more easily, such as without requiring excessively high temperatures, which would not be practical in a compact indoor air scrubber 10. For example, sorbent comprising solid-supported amine polymers provide for good adsorption of carbon dioxide and other gas species at room temperature with relatively low heat regeneration, as low as 60° C., 50° C. or even below 50° C. The regeneration may be performed at any suitable temperature, such as between about 20-200° C. and subranges thereof or at about 40-80° C. and subranges thereof.

The digital electronic circuit, namely the controller 156, governs the operating mode of the scrubber 10, including fan operation, damper positions, adsorption and regeneration. It also directs power to the fan 110 and in some embodiments, the fan 110 may be operated at different speeds. The control circuit of the controller 156 can control the fan speed by changing the voltage on the fan 110 or by driving the fan 110 with pulse width modulation. Different air flow speeds may be required for different conditions, for example, higher flow when more air cleaning is required, and lower air flow for less fan noise and less power usage. Optimal air flow for regeneration may also be different than the airflow during adsorption, and even during the regeneration process different rates of air flow during the different stages of regeneration may be required.

For example, in some embodiments, air speed is reduced during the part of the regeneration to allow the air to reach higher temperature and longer dwell time with the sorbent to maximize heat transfer to the sorbent. Air flow rate can be reduced by as much as 50%-80% to optimize heating rate. Once the sorbent achieves its target temperature, more airflow can be advantageous to accelerate the removal of the contaminates and the eventual cool down of the sorbent. The control circuit of the controller 156 further has the ability to direct power to the heating coil when needed for regeneration.

Figure 3A:
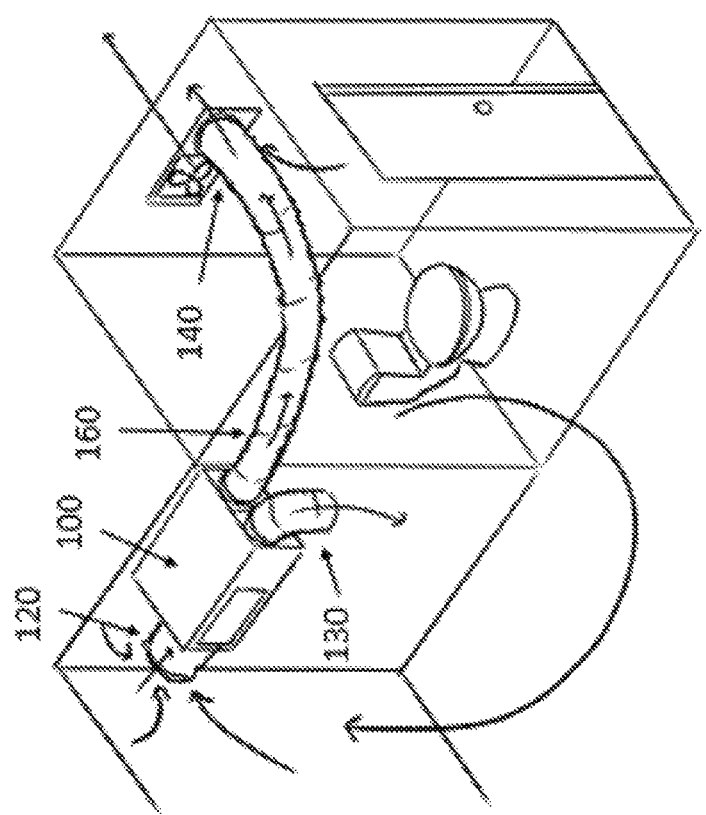
FIGS. 3A and 3B are each a schematic illustration of two configurations of the regeneration exhaust conduit.
Figure 3B:
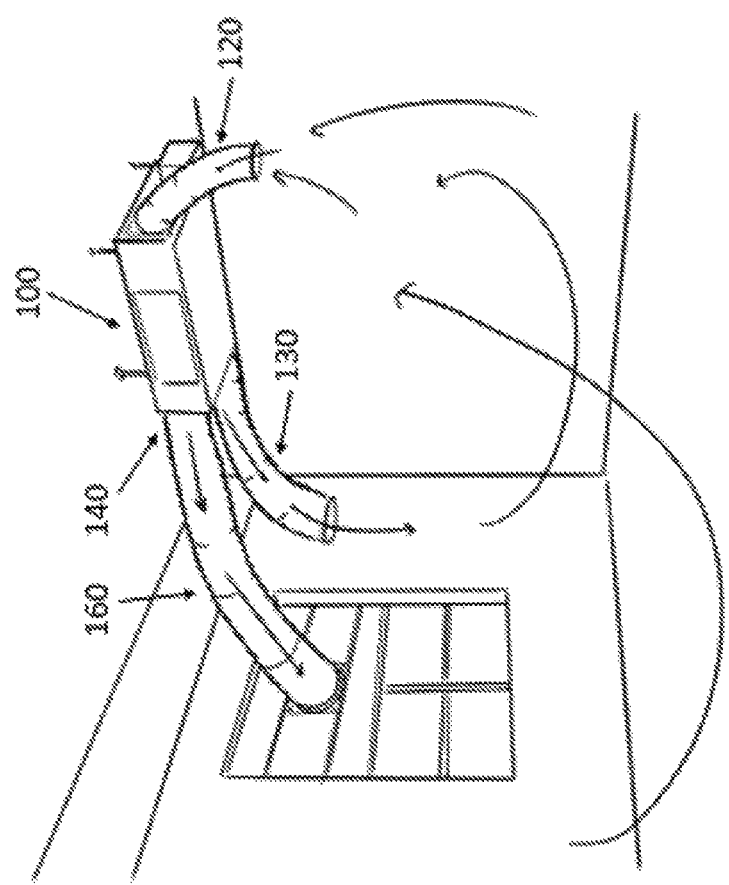

FIGS. 3A and 3B are each a schematic illustration of two configurations of the regeneration exhaust conduit, according to an embodiment of the present disclosure. For the ceiling-mounted scrubber 10 described herein, it is necessary to provide an appropriate and practical means of exhaust for the air stream during regeneration. FIGS. 3A and 3B depict how this is done by means of a small hose, duct or flexible outlet conduit 160 that extends from the exhaust outlet 140 to an appropriate outlet from the building. In some embodiments the exhaust outlet 140 may comprise a thermal insulation material and/or thermal insulating layer, to minimize heat exchange between the exhaust and the indoor space.

In one embodiment, shown in FIG. 3A, the second outlet 140 is connected to the exhaust of a nearby bathroom. Bathrooms in most public buildings, as well as in many residential homes, are routinely configured with an exhaust to provide ventilation. In some embodiments, the scrubber outlet conduit 160 can extend discreetly over the drop ceiling to the nearby bathroom where it can be attached to the exiting bathroom exhaust pathway.

In another embodiment, shown in FIG. 3B, the outlet conduit 160 extends to a nearby window or opening in the outside wall of the building, allowing the exhaust to be purged directly outside during regeneration.

Any other suitable outlet configuration can be utilized. These can include built-in smoke stacks, chimneys, elevator shafts, kitchen exhausts or any other suitable path that allows the purge air to flow outside the building. In one embodiment (not shown) the scrubber is adjacent to a window, allowing direct exhaust through the window.

Figure 4B:
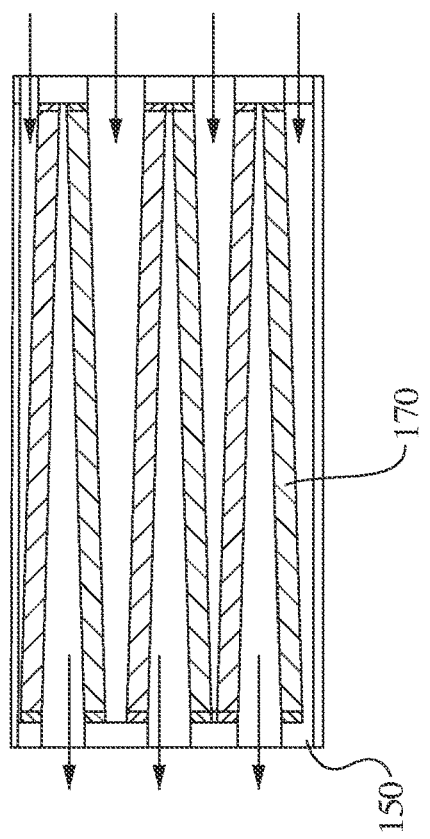
FIGS. 4A and 4B show a side view of the multi-sheet sorbent bank configuration, in 4A the sheets are parallel, and in 4B the sheets are slightly angled to form a V-bank, according to an embodiment of the present disclosure.
Figure 4A:
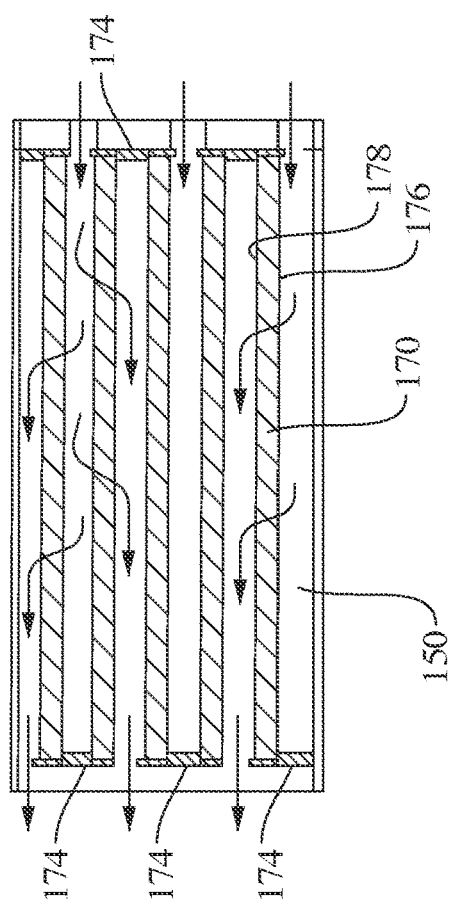

FIGS. 4A and 4B show a side view of the multi-sheet sorbent bank configuration, according to an embodiment of the present disclosure.

In order to increase the amount of air flowing through the sorbent and/or to reduce the flow resistance, multiple sheets, also referred to as cartridges 170, can be configured in a parallel or non-parallel geometry. One such parallel geometry is shown in FIG. 4A. In this embodiment, the sorbent bank 150 comprises six sheets 170 (or any other suitable number of sheets 170) that are placed in parallel to each other and to the air stream, with intermittent blockages 174, such that air is forced to flow through one of the sheets in order to get across the bank 150 in the direction of the air flow, illustrated by the arrows. The sheets in this configuration are typically flat and rectangular but may have other designs. In another embodiment the sheets are tilted relative to the floor of the cabinet 100 and to their neighboring sheets to form a zig-zag or V-bank patterns, as shown in FIG. 4B.

Each or some of the sorbent sheets or cartridges 170 can be constructed from a rigid frame 175 (FIG. 1B) that supports the sorbent material between two permeable surfaces 176 and 178, as disclosed in applicant's PCT application PCT/US2015/015690, which is incorporated herein by reference in its entirety. The cartridge 170 is configured to to receive an airflow through the first permeable surface 176, over and/or through the sorbent, and expel the airflow through the second permeable surface 178. The cartridge 170 can be divided into compartments or a honeycomb structure or any other structure to better support a granular sorbent material.

In some embodiments, each of the sorbent cartridges in the bank 150 can be removable and replaceable. This can be a desirable feature as many sorbents tend to age and lose efficacy over time (e.g. a few months or years), even with the TSA cycle. Thus periodically the sorbent cartridges 170 can be replaced with new cartridges and fresh sorbent. To this end the scrubber 10 may be formed with a removable or movable access panel 102 (FIG. 1A) that can be opened, allowing access to the sorbent sheets 170 which in turn can be pulled out, with new sheets inserted in their place. The panel 102 can be hinged or entirely removable.

In other embodiments, the sorbent bank 150 can have non-planar cartridges each comprising a single monolithic structure such as a V-bank, one or more hollow cylinders, or any other suitable form designed to enable air to flow through the sorbent material.

FIGS. 5A, 5B, 5C, 5D, 5E and 5F each show elements of an embodiment of a fan assembly 110, according to an embodiment of the present disclosure.

In some embodiments, the fan design is an important consideration in the design of the entire system. The fan 110 (also referred to as the fan assembly 110) may be designed to be as quiet as possible, because the scrubber 10 operates in close proximity to people who are working or living in the room or space. It further may deliver a uniform air stream through the low-profile rectangular cross section of the scrubber 10, which is dictated by the ceiling-mount design and the cartridge bank design. Finally, the fan 110 may produce sufficient thrust or static pressure to effectively drive the air stream though the dense sorbent bed, as well as the particle filters (220 in FIG. 7A) and any other air treatment components along the flow path of the air.

In one embodiment, the fan 110 can be implemented in the form of multiple cylindrical impellers 190 attached to a common horizontal axis 192 that is oriented in the lateral direction, namely along the width (W) of the cabinet 100, perpendicular to the longitudinal direction of the air flow. This two-impeller 190 configuration is shown schematically in FIGS. 5A-5C. In a non-limiting example the two-impeller 190 configuration is comprises two cylindrical impellers, each with a 10 centimeter diameter. The lateral-axis, multi-impeller fan is beneficial in providing air flow that is evenly distributed along the entire cross section of the cabinet. In contrast, a fan 110 turning on a longitudinal axis would be limited by the vertical profile of the cabinet. In some embodiments additional impellers may be arranged along axis 192. FIG. 5D illustrates four impellers on a shared axis 192, and 5E illustrates the corresponding assembly with a housing 194 and a panel 210 and FIG. 5F shows the four impeller design with the motor in the middle.

A cylindrical impeller 190 draws in air along the flat ends, or bases, of the cylinder, so a single long cylinder would draw in air mostly along the edges of the rectangular cross section of the cabinet 100, in contrast, having two or four or more separate cylindrical impellers 190 on the same axis presents a more even distribution for drawing air along the entire cross section while also pushing air forward through the entire cross section. The shared axis 192 is not only geometrically suitable but also allows a single motor 194 to drive all the impellers 190 through one common axis.

The multi-impeller fan is enclosed by a housing 196 with a plurality of openings at housing inlet 204 along the cylindrical bases for drawing air, and a plurality of openings at housing outlet 206 located on a flat front attached to a panel 210, which is configured with matching openings or windows through which the air flows out. The housing 196 is attached to the panel 210 that fits into a cross section of the scrubber cabinet, as shown in FIG. 1B. The panel 210, the housing 196, the motor 194 and the impellers 190 are referred to as the fan assembly 110. The fan assembly 110 can be positioned before or after the sorbent bank 150 and the heater 152. There is an advantage in placing the fan before, or "upstream" of, the heater 152 and the bank 150 so that the fan 110 itself is not exposed to the heated air, for example if the heat is detrimental to the fan motor or other fan components.

In some embodiments, a critical feature of the fan is quiet operation, specifically its ability to deliver the required thrust with minimal noise. Quiet performance of an indoor air scrubber is important for minimal disruption to the occupants, as explained above. While other fan designs can be used to provide required air flow, the multiple cylindrical impellers deliver the required flow, thrust and distribution with lower speeds and therefore lower noise, especially with forward curved blades. In some embodiments, noise of less than about 45 dB, or less than about 50 dB is required. Tests show that a dual-impeller fan with two, 10 centimeter diameter, cylindrical forward curved impellers, delivered 150 CFM with a noise level of approximately 35 dB and sufficient thrust to deliver static pressure of 500 Pascal.

In one embodiment, a single motor, dual centrifugal forward curved impeller fan in horizontal housing configuration is used. FIGS. 5A-5C show such a fan. The fan 110 is attached to a cross-sectional panel that is attached to the inner walls of the cabinet 100. The fan utilizes two cylindrical impellers with 10 centimeter (cm) diameter and 10 cm length each, with a gap of about 10 cm between the two impellers, for a total assembly length of approximately 30 cm. Turning to FIGS. 5D, 5E and 5F, it is shown that in some embodiments, the fan assembly 110 may be configured with two impellers 190 at each side of the horizontal axis 192. A plurality of impellers 190 may be arranged on the axis 192.

This wide form, dual fan configuration, shown in FIGS. 5A-5F, provides a good horizontal distribution of the air flow with the low vertical profile, allowing optimal utilization of the horizontal sorbent sheets 170 and generally making best use of the rectangular cross section of the scrubber 10. Furthermore, the forward impellers 190 deliver the required air flow with lower noise than axial fans or conventional impeller fans.

FIG. 6 shows a side view of the fan assembly 110 inside the cabinet 100 with the supporting panel 210 tilted relative to the vertical orientation to improve air distribution among the sorbent sheets 170, according to an embodiment of the present disclosure. As seen in FIG. 6, in some embodiments, air flow among the sheets 170 is another important consideration in the design. The lateral-axis multiple impeller fan design generally provides a wide rectangular flow and pressure front. However, the air emerges from the fan housing 196 tangentially, which in the assembly configuration shown is on the upper side of the fan panel. In a low-profile cabinet, this would result in more air flow through the upper sheets of the sorbent bank, therefore underutilizing the lower sheets. The uneven air distribution can be corrected with a small tilt in the fan as shown in FIG. 6. In one embodiment, the panel 210 is arranged at an oblique angle relative to the height direction H of the cabinet 100 and the tilt is approximately 10 degrees. In other embodiments the tilt is between about 5 degrees to 30 degrees and values and subranges thereof in some embodiments the tilt can be between about 2 degrees and 45 degrees and values subranges thereof.

In some embodiments, the scrubber 10 is deployed as a multi-pass scrubber, namely the same air volume passes many times through the scrubber 10 in a given period of time. The clean, scrubbed air is returned via the first outlet 130 into the room. The room air thereafter enters the scrubber via inlet 120. As a result, complete cleaning of the air during a single pass is neither necessary nor even optimal, but rather the cumulative cleaning effect of multiple passes is the functional objective and a criterion for design.

FIGS. 7A and 7B each show a low profile scrubber with a pre-filter assembly, according to an embodiment of the present disclosure.

As shown in FIGS. 7A and 7B, in some embodiments, in addition to the sorbent bank 150, other air treatment components can be introduced before or after the bank 150 in the flow path of the air. A particulate filter 220 can be introduced between the first inlet 120 and the fan 110, to capture dust and other solid particulates and prevent them from building up on the fan 110, the heater 152 and the sorbent bank 150, or from circulating back in the room air. Similarly, particulate filters can be configured downstream, after the sorbent bank 150, to prevent the particulate from circulating back into the room.

The removal of particulate matter (PM), including the dust and other solid particulates, from the air stream is an important benefit in environments with high PM pollution. The removal of PM from an airstream is conventionally performed by any of a wide variety of air cleaning components such as media filters, where air flows through a permeable medium like paper or fabric, and particles are captured by the fibers. However, such filters tend to have short operating life as they become clogged with the captured solids, and therefore require frequent replacement. Frequent replacement of filter media in an indoor scrubber, and especially a hard-to-reach ceiling-mounted scrubber, can be disruptive and onerous to the people working or living in the space or room. Electrostatic precipitators are may be used as a mechanism to capture PM, but these too require frequent maintenance and cleaning which can be disruptive and onerous.

In some embodiments, cyclonic separation of the PM from the air stream can provide a low-maintenance alternative to replaceable filters. The cyclonic separation can be implemented by passive monolithic arrays of small cyclonic separators as disclosed in applicant's PCT application PCT/US2016/043922, which is incorporated herein by reference in its entirety. These arrays provide an effective removal of PM with very long operating life, without being replaced or cleaned. FIG. 7A shows the particulate filter 220 comprising a cyclonic array subassembly configured at the inlet side of the scrubber 10, before the fan 110. In this embodiment the cyclonic separator subassembly 220 comprises a plurality of monolithic arrays 222 that can be organized as parallel horizontal layers. Other configurations are also possible, including single layer or a vertically arranged array. The cyclonic separator subassembly 220 is supported inside the cabinet with rails, tracks, tabs or posts that hold the cyclonic separator subassembly 220 in place. The cyclonic separator subassembly 220 can nevertheless be removed and replaced if necessary by opening the side panel and sliding it out. In some embodiments, the location of the cyclonic sub assembly 220 can be between the fan 110 and the sorbent bed 150 or after the sorbent bed 150. In some embodiments the cyclonic array subassembly 220 can be a separate module that is outside the main cabinet 100, attached to the inlet or outlet of the scrubber, as shown in FIG. 7B, for example.

Other air cleaning components, besides the particulate filters and the cyclonic separator subassembly, that may be incorporated include, but are not limited to, ultraviolet sources, ionizers, electrostatic precipitators, catalysts, antimicrobial materials, deodorizers, and other media filters. In some embodiments, a carbon fiber layer may be used to remove certain odors or contaminants from the air.

FIG. 8 shows a scrubber where the exhaust outlet is located on the cabinet between the sorbent bank and a subsequent air cleaning component, according to an embodiment of the present disclosure. As shown in FIG. 8, in some embodiments, the regeneration exhaust outlet 140 can be configured to remove the exhaust air before it reaches these additional air cleaning component. In this configuration there would be a "dead" space 226 between the sorbent bank 150 and additional downstream air cleaning components, an exhaust outlet 140, and the exhaust outlet 140 would draw air from this space. The exhaust outlet 140 can be then located on the side, the bottom or the top of the cabinet adjacent to this space, as shown in FIG. 8. By locating the exhaust outlet 140 upstream from these air cleaning components, the warm exhaust air does not flow through these air cleaning components, thus minimizing their unintentional heating and also preventing the exhausted contaminants from reaching these air cleaning components.

In a non-limiting exemplary scrubber 10, such as shown in FIGS. 1A and 1B, a lateral-axis dual impeller fan is used to deliver a flow rate of 150 CFM through a six-sheet cartridge bank. Each sheet is a 400×450 mm rectangle that is 20 mm thick. If placed over a room with a floor area of 500 square feet and 9-foot ceiling height, namely a volume of 4500 cubic feet, the scrubber treats an amount of air equivalent to the entire room volume every 30 minutes. As long as sorbents capture a percentage of the contaminants that is equivalent or higher than the amount introduced into the room during that time, their concentration in the air will be continually maintained or reduced.

In some embodiments the scrubber 10 may be attached to a wall or a window rather than the ceiling. If the scrubber is attached to a window or external wall, the exhaust outlet could be directly open to the outside, eliminating the need for an exhaust duct.

The electronic circuits of the controller 156 that control the scrubber determine whether the fan 110 is on, and in the case of a variable speed fan, they can control the fan speed via voltage, amplitude or pulse width modulation. They further control which dampers are open and how much power is delivered to the heater 152 at any time. Software implemented algorithms can determine when and how long the system undergoes regeneration. Alternatively, regeneration can be scheduled manually by a user or communicated to the control circuit of the controller 156 by an external digital signal or a portable device including but not limited to a smart phone, a remote controller or a portable computer. The communication can be wired or wireless and use any suitable technology, network and protocol, including but not limited to infrared, WiFi, Bluetooth®, LoRa®, or any suitable technology or standard.

The scrubber 10 may comprise various sensors 230 (FIG. 1B) for detecting air quality metrics. Such sensors may include carbon dioxide, carbon monoxide, oxygen, formaldehyde, TVOC (total volatile organic compounds), temperature, humidity, and particulate sensors such as PM2.5, PM10, PM1.0, or any other air quality sensor. The sensors 230 may be configured to measure the concentration level of the type of gas of the gas species in the indoor airflow. The control circuits can receive the readings from these sensors 230. The readings can be stored or communicated to other devices. The sensor readings can also be used to determine the optimal fan speed or whether to start a regeneration cycle, and for how long. In some embodiments, the sensor 230 may be positioned out of the scrubber 10 at a suitable location within the room and/or out of the room.

In some embodiments, the operation of the scrubber 10 may include an adsorption mode and a regeneration mode. The controller 156 is configured to operate the adsorption mode and the regeneration mode and control the first and second outlet dampers 154 and 155, fan 110 and heater 152.

During the adsorption mode, the impellers 190 draw indoor airflow from the indoor area. The indoor air enters the inlet 120 of the cabinet 100 and then the inlet of the housing 196 of the fan assembly 110. The indoor airflow is optionally directed over the heater 152 in an inactive mode and into the sorbent bank 150 such that at least a portion of the gas species contained in the airflow is captured by the sorbent. The indoor airflow then exits the cabinet 100 via the first outlet 130 of the cabinet 100.

During the regeneration mode, the impeller 190 draws an indoor airflow from the indoor area. The indoor air enters the inlet 120 of the cabinet 100 and then the inlet 204 of the housing 196 of the fan assembly 110. The indoor airflow is directed over the heater 152 in the active mode and thereafter the heated indoor airflow is directed to flow over the sorbent such that at least a portion of the gas species, captured by the sorbent during the adsorption mode, is released therefrom and then out the second outlet 140 of the cabinet 100.

The controller 156 controls the first and second outlet dampers 154 and 155, fan 110 and heater 152 based upon at least one of a schedule (i.e. in which mode, e.g. adsorption or regeneration, the scrubber operates) and a concentration level of the type of gas in the indoor airflow.

FIG. 9 shows an indoor air gas adsorption system 250 comprising a plurality of scrubbers 10 in communication with a console 252, by digital communication or any other suitable means, according to an embodiment of the present disclosure. The console 252 may comprise one or more of air quality sensors 230, and digital electronics 254, display 256, and communications circuitry 258. The console 252 can send a signal to turn on and off the individual scrubbers 10. It may do so based on sensor readings, scheduling, external signals received by the console 252, or any other algorithm that is implemented within the console 252 or within another computer that communicates with the console 252. The console 252 can also communicate with other digital systems that directly or indirectly control the building's HVAC, like a Building Management System.

In some embodiments, the scrubber 10 may comprise a first inlet and a second inlet. In some embodiments the first inlet may be configured for introducing indoor air into the scrubber 10 for contaminate removal thereof and the second inlet may be for introducing indoor or outdoor air into the scrubber for regeneration of the scrubber.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of," "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "compose d of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An indoor air cleaning apparatus for removing at least a portion of at least one type of gas from an indoor area of a building, the apparatus comprising:
    a cabinet including at least one inlet, a first outlet, and a second outlet, and configured for deployment from an elevated position within an indoor area of a building;
    a plurality of dampers for managing airflow;
    at least one sorbent bank comprising a plurality of cartridges, wherein each cartridge comprises a first and a second permeable surface, and one or more sorbent materials contained therein;

a fan assembly comprising a panel including at least one panel opening, at least one motor, and a plurality of cylindrical impellers, wherein;
   the fan assembly is configured to:
      cover a cross section of the cabinet perpendicular to an airflow direction of the fan assembly, and
      direct airflow toward at least the sorbent bank; and
   the panel is arranged at an oblique angle relative to a height direction of the cabinet between 2 and 45 degrees;
a heating element configured to heat an airflow when in an active mode; and
a controller configured to operate in at least two modes: an adsorption mode and a regeneration mode,
wherein:
   in the adsorption mode, the plurality of impellers draw an indoor airflow from the indoor area via the inlet of the cabinet, whereby at least a portion of at least one type of gas contained in the airflow is captured by the sorbent, the indoor airflow then exiting the cabinet via the first outlet of the cabinet,
   in the regeneration mode, the plurality of impellers draw an indoor airflow from the indoor area, the indoor airflow entering the inlet of the cabinet, whereby the indoor airflow is directed over the heating element in active mode and directed to flow over the sorbent such that at least a portion of the at least one type of gas captured by the sorbent during the adsorption mode is released therefrom, then out the second outlet of the cabinet, and
   the controller controls the plurality of dampers, the fan assembly and the heating element based upon at least one of a schedule and a concentration level of the at least one type of gas in the indoor airflow.

2. The apparatus of claim 1, wherein deployment comprises hanging the apparatus from at least one of a ceiling and a wall of the indoor area.

3. The apparatus of claim 1, further comprising a filter configured for removing particulate matter from the airflow, wherein the filter is arranged to filter the airflow prior to or after being received by the sorbent bank.

4. The apparatus of claim 3, wherein the filter comprises a plurality of cyclonic separators.

5. The apparatus of claim 1, wherein the panel is arranged at an oblique angle relative to a height direction of the cabinet between 5 and 30 degrees.

6. The apparatus of claim 1, further comprising a conduit in fluid communication with the second outlet, wherein the conduit is configured to carry the airflow expelled by the second outlet away from the indoor area or outside the building.

7. The apparatus of claim 1, wherein the at least one sorbent bank is configured for access such that each of the plurality of cartridges can be removed or replaced.

8. The apparatus of claim 7, wherein access is via at least one of an opening and/or a removable or movable access panel.

9. The apparatus of claim 1, wherein at least two of the plurality of cartridges are arranged substantially parallel to each other and to an overall airflow direction.

10. The apparatus of claim 1, further comprising at least one of: one or more appendages, brackets, hooks, ears, holes, bars, tabs, and sockets.

11. An indoor air cleaning method for adsorbing at least one type of gas from an indoor airflow without use of an independent ventilation or circulation system, the method comprising deploying one or more apparatuses of claim 1 from an elevated position within the indoor area and operating the one or more apparatuses to remove at least a portion of the at least one type of gas from the indoor air of the room.

12. The method of claim 11, wherein deploying comprises hanging the one or more apparatuses from at least one of a ceiling or a wall of the room.

13. The method of claim 11, wherein deploying comprises placing the one or more apparatuses within a drop ceiling such that, the one or more apparatuses are configured to receive indoor air from the indoor area via a first grill or first opening in the drop ceiling, and returns air to the indoor area via a second grill or second opening in the drop ceiling.

14. An indoor air cleaning apparatus for removing at least a portion of at least one type of gas from an indoor area of a building, the apparatus comprising:
   a cabinet including at least one inlet, a first outlet, and a second outlet, and configured for deployment from an elevated position within an indoor area of a building;
   a plurality of dampers for managing airflow;
   at least one sorbent bank comprising a plurality of cartridges, wherein each cartridge comprises a first and a second permeable surface, and one or more sorbent materials contained therein;
   a fan assembly comprising a panel including at least one panel opening, at least one motor, and a plurality of cylindrical impellers, wherein;
      the fan assembly is configured to:
         cover a cross section of the cabinet perpendicular to an airflow direction of the fan assembly, and
         direct airflow toward at least the sorbent bank; and
   a heating element configured to heat an airflow when in an active mode;
   a filter comprising a plurality of cyclonic separators configured for removing particulate matter from the airflow, wherein the filter is arranged to filter the airflow prior to or after being received by the sorbent bank, and
   a controller configured to operate in at least two modes: an adsorption mode and a regeneration mode,
   wherein:
      in the adsorption mode, the plurality of impellers draw an indoor airflow from the indoor area via the inlet of the cabinet, whereby at least a portion of at least one type of gas contained in the airflow is captured by the sorbent, the indoor airflow then exiting the cabinet via the first outlet of the cabinet,
      in the regeneration mode, the plurality of impellers draw an indoor airflow from the indoor area, the indoor airflow entering the inlet of the cabinet, whereby the indoor airflow is directed over the heating element in active mode and directed to flow over the sorbent such that at least a portion of the at least one type of gas captured by the sorbent during the adsorption mode is released therefrom, then out the second outlet of the cabinet, and
      the controller controls the plurality of dampers, the fan assembly and the heating element based upon at least one of a schedule and a concentration level of the at least one type of gas in the indoor airflow.

* * * * *